(12) United States Patent
Smith et al.

(10) Patent No.: US 11,301,398 B2
(45) Date of Patent: Apr. 12, 2022

(54) SYMBOLIC NAMES FOR NON-VOLATILE MEMORY EXPRESS (NVME™) ELEMENTS IN AN NVME™-OVER-FABRICS (NVME-OF™) SYSTEM

(71) Applicant: DELL PRODUCTS L.P., Round Rock, TX (US)

(72) Inventors: Erik Smith, Douglas, MA (US); Joseph Lasalle White, San Jose, CA (US); David Black, Acton, MA (US); Raja Subbiah, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/925,131

(22) Filed: Jul. 9, 2020

(65) Prior Publication Data

US 2021/0286741 A1    Sep. 16, 2021

Related U.S. Application Data

(63) Continuation-in-part of application No. 16/896,216, filed on Jun. 10, 2020, which is a continuation-in-part
(Continued)

(30) Foreign Application Priority Data

Apr. 25, 2020    (IN) .............................. 202011017755

(51) Int. Cl.
*G06F 13/16*    (2006.01)
*G06F 13/40*    (2006.01)

(52) U.S. Cl.
CPC ...... *G06F 13/1668* (2013.01); *G06F 13/4027* (2013.01)

(58) Field of Classification Search
CPC ....................... G06F 113/1668; G06F 13/4027
See application file for complete search history.

(56) References Cited

U.S. PATENT DOCUMENTS

2018/0074717 A1    3/2018    Olarig
2018/0270119 A1    9/2018    Ballapuram
(Continued)

OTHER PUBLICATIONS

Notice of Allowance and Fee(s) Due maild Apr. 30, 2021, in related U.S. Appl. No. 16/820,547. (5pgs).
(Continued)

*Primary Examiner* — Glenn A. Auve
(74) *Attorney, Agent, or Firm* — North Weber & Baugh LLP

(57) ABSTRACT

Presented herein are embodiments for providing and using a symbolic name for referencing an element of a non-volatile memory express (NVMe™) entity in an NVMe™-over-Fabric (NVMe-oF™) environment. In one or more embodiments, the symbolic name may be used to identify an element of an NVMe™ host or NVM subsystem in one or more processes. In one or more embodiments, a symbolic name may be provided as part of a registration process. Symbolic names may be used for identifying elements when performing other processes, such as masking and zoning for granting access rights. In one or more embodiments, a symbolic name may be shared by two or more elements.

20 Claims, 22 Drawing Sheets

Related U.S. Application Data of application No. 16/898,191, filed on Jun. 10, 2020, which is a continuation-in-part of application No. 16/820,547, filed on Mar. 16, 2020, now Pat. No. 11,163,716.

(56) References Cited

U.S. PATENT DOCUMENTS

| | | |
|---|---|---|
| 2019/0245924 A1 | 8/2019 | Li |
| 2020/0065269 A1 | 2/2020 | Balasubramani |
| 2020/0081640 A1 | 3/2020 | Enz |
| 2020/0310657 A1 | 10/2020 | Cayton |
| 2020/0319812 A1 | 10/2020 | He |
| 2020/0349094 A1 | 11/2020 | Smith |
| 2020/0409893 A1 | 12/2020 | Puttagunta |
| 2021/0019272 A1* | 1/2021 | Olarig .............. G06F 13/1668 |
| 2021/0028987 A1 | 1/2021 | Krivenok |
| 2021/0064281 A1 | 3/2021 | Satapathy |
| 2021/0124695 A1 | 4/2021 | Jaiswal |

OTHER PUBLICATIONS

"FC and FCoE versus iSCSI—"Network-centric" versus "End-Node-centric" provisioning," [online], [Retrieved Oct. 12, 2020], Retrieved from Internet <URL: https://brasstacksblog.typepad.com/brass-tacks/2012/02/fc-and-fcoe-versus-iscsi-network-centric-versus-end-node-centric-provisioning.html> (6pgs).

"NVMe over Fabrics' Discovery problem," [online], [Retrieved Oct. 12, 2020] Retrieved from Internet <URL: https://brasstacksblog.typepad.com/brass-tacks/2017/12/nvme-over-fabrics-discovery-problem.html> (2pgs).

"Hard zoning versus soft zoning in a FC/FCoE SAN," [online], [Retrieved Oct. 12, 2020] Retrieved from Internet <URL:https://brasstacksblog.typepad.com/brass-tacks/2012/01/hard-zoning-versus-soft-zoning-in-a-fcfcoe-san.html> (5pgs).

"NVM Express Over Fabrics," revision 1.0, May 31, 2016, [online], [Retrieved Oct. 12, 2020] Retrieved from Internet <URL:http://nvmexpress.org> (49pgs).

"NVM Express Over Fabrics," revision 1.1, Oct. 22, 2019, [online], [Retrieved Oct. 12, 2020] Retrieved from Internet <URL:http://nvmexpress.org> (83pgs).

"NVM Express Base Specification," revision 1.4, Jun. 10, 2019, [online], [Retrieved Oct. 12, 2020] Retrieved from Internet <URL:http://nvmexpress.org> (403pgs).

Non-Final Office Action dated Jun. 11, 2021, in U.S. Appl. No. 16/898,216. (10 pgs).

Non-Final Office Action dated Jun. 11, 2021, in U.S. Appl. No. 16/898,191. (7 pgs).

Response filed Apr. 9, 2021, in related U.S. Appl. No. 16/820,547. (10pgs).

Non-Final Office Action dated Jan. 21, 2021, in U.S. Appl. No. 16/820,547. (6 pgs).

Notice of Allowance and Fee(s) Due maild Jul. 9, 2021, in related U.S. Appl. No. 16/820,547. (7pgs).

Notice of Allowance and Fee(s) Due maild Aug. 23, 2021, in related U.S. Appl. No. 16/820,547. (7pgs).

Response filed Sep. 13, 2021, in related U.S. Appl. No. 16/898,216. (19pgs).

Response filed Sep. 13, 2021, in related U.S. Appl. No. 16/898,191. (13pgs).

Notice of Allowance and Fee(s) Due maild Oct. 13, 2021, in related U.S. Appl. No. 16/898,216. (5pgs).

Notice of Allowance and Fee(s) Due maild Oct. 13, 2021, in related U.S. Appl. No. 16/898,191. (5pgs).

* cited by examiner

_500_

| 0 | OpCode= E1h | FUSE, Reserved, PSDT | CID | 3 |
|---|---|---|---|---|
| 4 | NSID = 0h ||| 7 |
| 8 | Reserved ||| 15 |
| 16 | MPTR – Not used, Reserved ||| 23 |
| 24 | DPTR – SGL1 ||| 39 |
| 40 | CDW10 _/ 505 ||| 43 |
| 44 | 510 \_CDW11 ||| 47 |
| 48 | CDW12 – Reserved ||| 51 |
| 52 | CDW13 – Reserved ||| 55 |
| 56 | CDW14 – Reserved ||| 59 |
| 60 | CDW15 – Reserved ||| 63 |

FIG. 5

SYMBOLIC NAMES FOR NON-VOLATILE MEMORY EXPRESS (NVME™) ELEMENTS IN AN NVME™-OVER-FABRICS (NVME-OF™) SYSTEM

CROSS-REFERENCE TO RELATED APPLICATION

This patent application is a continuation-in-part of and claims priority benefit under 35 USC § 120 to co-pending and commonly-owned U.S. patent application Ser. No. 16/898,216, filed on 10 Jun. 2020, entitled "IMPLICIT DISCOVERY CONTROLLER REGISTRATION OF NON-VOLATILE MEMORY EXPRESS™ (NVME™) ELEMENTS IN AN NVME™-OVER-FABRICS (NVME™-OF)," and listing Erik Smith, Joseph White, David Black, and Raja Subbiah as inventors, which patent application is a continuation-in-part of and claims priority benefit under 35 USC § 120 to co-pending and commonly-owned U.S. patent application Ser. No. 16/898,191, filed on 10 Jun. 2020, entitled "TARGET DRIVEN ZONING FOR ETHERNET IN NON-VOLATILE MEMORY EXPRESS™ OVER-FABRICS (NVME-OF™) ENVIRONMENTS," and listing Erik Smith, Joseph White, David Black, and Raja Subbiah as inventors, which patent application:

(1) is a continuation-in-part of and claims priority benefit under 35 USC § 120 to co-pending and commonly-owned U.S. patent application Ser. No. 16/820,547, filed on 16 Mar. 2020, entitled "DISCOVERY CONTROLLER REGISTRATION OF NON-VOLATILE MEMORY EXPRESS™ (NVMe™) ELEMENTS IN AN NVMe™-OVER-FABRICS (NVMe-oF™) SYSTEM," and listing Erik Smith, Joseph White, David Black, and Raja Subbiah as inventors; and (2) claims priority to and the benefit of under 35 USC § 119 the provisional patent application entitled "TARGET DRIVEN ZONING FOR ETHERNET IN NON-VOLATILE MEMORY EXPRESS™ OVER-FABRICS (NVME-OF™) ENVIRONMENTS," Indian Patent Application Number 202011017755, filed in the Indian Patent Office on 25 Apr. 2020.

Each patent document is incorporated by reference herein in its entirety and for all purposes.

BACKGROUND

The present disclosure relates generally to an information handling system. More particularly, the present disclosure relates to NVMe™ hosts, NVM subsystems, or both in an NVMe™-over-Fabrics (NVMe-oF™) environment.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Enterprise customers are under tremendous pressure to reduce the expense for data storage. To this end, as the customers review their infrastructures and look for opportunities to eliminate costs, some have come to view the Fibre Channel Storage Area Network (FC SAN) as an unnecessary expense. That is, at least until they realize that any savings they would achieve through a capital expenditure reduction (e.g., by moving off of FC and onto NVMe-oF™ (TCP)) may be more than paid back in operational expense due to the end-node centric nature of Ethernet-based transports.

In addition, until recently, the performance attributes of storage traffic over Ethernet were significantly worse than FC's. For example, CPU utilization and latency were typically much higher; input-output-per-second (IOPs)/bandwidth were typically significantly lower. However, upon introduction of a new storage networking protocol "NVMe™" and its use of RoCE (Remote Direct Memory Access (RDMA) over Converged Ethernet), all of this has changed and NVMe™ over 25 G RoCE has equivalent CPU utilization, input-output operations per second (IOPS) and latency as SCSI-FCP over 32 Gigabits Fiber Channel (GFC).

FC is considered by some to be the most popular transport protocols because: (1) it provides a relatively complete set of supported devices and data services; and (2) the customers of FC have spent the past twenty years developing business processes and deployment best practices around FC and its network-centric approach to provisioning.

A basic problem of an Ethernet transport for NVMe-oF™, such as transmission-control protocol (TCP) or remote-direct-memory-access (RDMA) over converged-Ethernet (RoCE), is that the underlying Ethernet transport is an end-node centric storage protocol (i.e., every NVMe™ host must be explicitly configured to access storage at one or more IP addresses). This configuration process is tedious and error prone as well as needing manual intervention in the case of a temporary loss of connectivity (e.g., storage-side cable pull). The current management process of an NVMe-oF-over-Ethernet transport also requires configuration of the multipathing software.

Accordingly, it is desirable to provide solutions that resolve the end-node device configuration problems, including access control, of NVMe-oF-over-Ethernet transports.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

FIG. 5 depicts a discovery controller registration command, according to embodiments of the present disclosure.

DETAILED DESCRIPTION OF THE PREFERRED EMBODIMENTS

Figure 1:
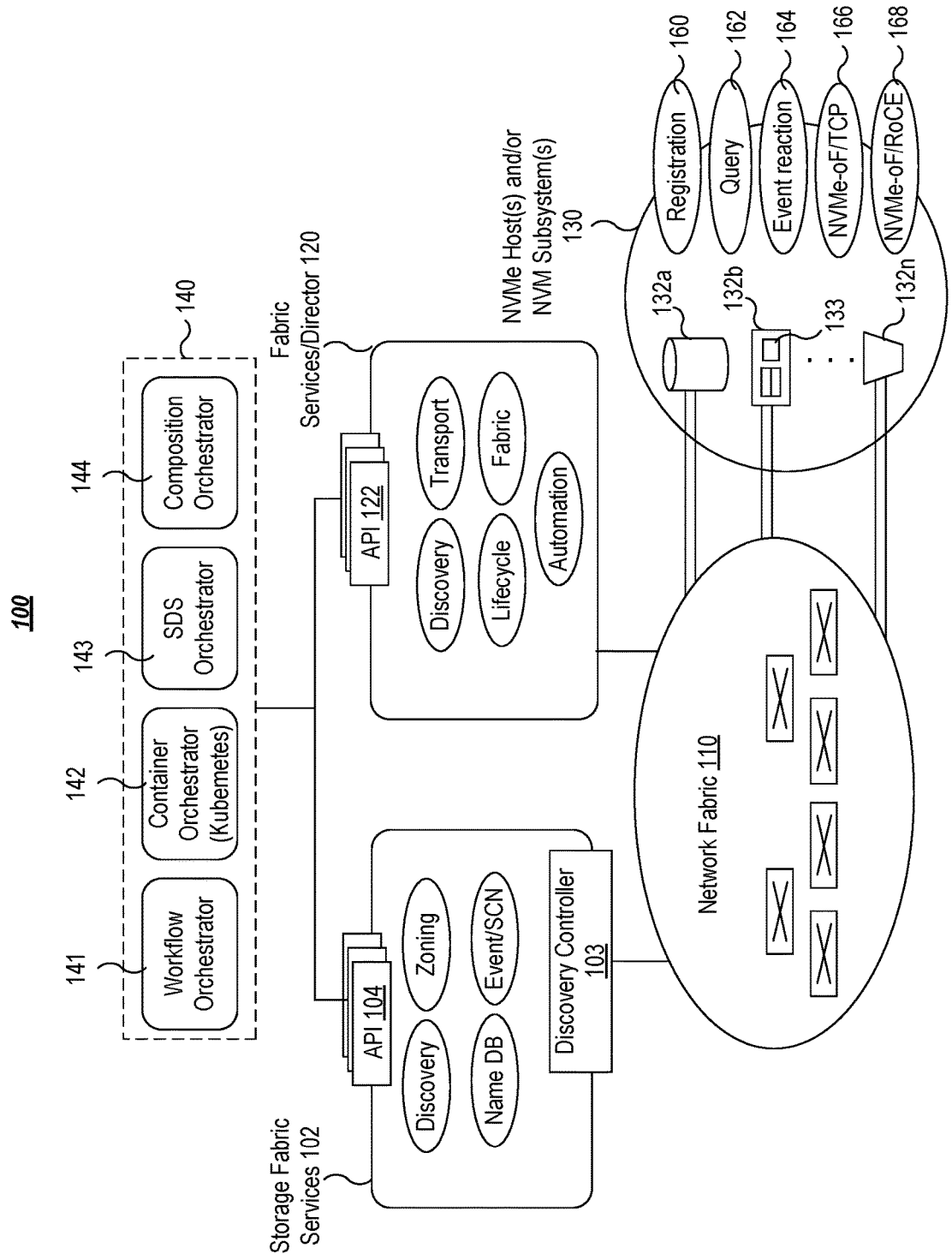
FIG. 1 ("FIG. 1") depicts an NVMe-oF™ ecosystem, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledge, message, query, etc., may comprise one or more exchanges of data.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists that follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits and may be used interchangeably.

It shall be noted that: (1) certain steps may optionally be performed; (2) steps may not be limited to the specific order set forth herein; (3) certain steps may be performed in different orders; and (4) certain steps may be done concurrently.

A. General Introduction

Embodiments herein address limitations of prior approaches by providing a set of storage fabric services, which may be embodied in or implemented using a Storage Fabric Services (StFS) component, that can be used to support discovery of end device information and supported protocols. In one or more embodiments, a StFS leverage and extend existing networking services, such as SmartFabric Services (SFS) to provide such features, which is described in commonly-owned U.S. patent application Ser. No. 16/263,791, filed on 31 Jan. 2019, entitled "SWITCHING FABRIC CONFIGURATION AND MANAGEMENT SYSTEM," and listing Joseph White, Balaji Rajagopalan, Pawan Singal, Charles Park, and Saleem Muhammad as inventors, which patent document is incorporated by reference herein in its entirety.

As provided in more detail below, embodiments add several ecosystem level innovations, including but not limited to: (1) an NVMe™ Discovery Controller, which may reside, for example, on a switch or in a VM attached to the storage fabric, that acts as a centralized discovery service and support; (2) ability of NVMe™ hosts and NVM subsystems to discover the centralized discovery service automatically; (3) ability of NVMe™ hosts and NVM subsystems to centrally register transport information and registration of access control-related information; (4) one or more NVMe™ host-based services that facilitates: (a) registration of host transport-specific information with a centralized discovery service; (b) querying the centralized discovery service to discover the transport-specific information associated with one or more NVM subsystems it has been granted access to; (c) modifying one or more hosts' NVMe™-over-Fabrics connectivity information and establishing connectivity to one or more available NVM subsystems using the best protocol supported by both end devices; (d) updating host NVMe™ multipathing information; and (e) listening for asynchronous events and performing one or more connectivity remediation actions based upon those events; and (5) one or more NVM subsystem-based services that facilitates: (a) registering NVM subsystem transport-specific information with a centralized discovery service; (b) querying the centralized discovery service to discover the transport-specific information associated with one or more NVMe™ hosts that may potentially be allowed to access namespaces on that array; (c) modifying the namespace access control mechanism of an NVM subsystem to allow one or more NVMe™ hosts to access specific namespaces; (d) publishing a list of the NVMe™ hosts that have been granted access to a particular NVM subsystem interface to the discovery controller; and (e) listening for asynchronous events and performing one or more connectivity remediation actions based upon those events.

In one or more embodiments, these features provide a FC-like end-user experience.

B. Explicit Registration Embodiments

FIG. 1 depicts an NVMe™-over-Fabrics (NVMe-oF™) system 100, according to embodiments of the present disclosure. As depicted, the system 100 may include: a Storage Fabric Service (StFS) 102, which includes (among other features or services) a discovery controller 103 (which may also be referred to as an NVMe™ discovery controller, a centralized discovery controller, or a root discovery controller) that provides access to the discovery services for NVMe™ hosts (e.g., 132b) and NVM storage subsystems (e.g., 132a and 132n); a network fabric 110 that may include one or more switches and routers; a fabric service/director 120 (such as, SmartFabric Service/Director by Dell of Round Rock, Tex.—although embodiments herein reference SmartFabric Service/Director, it shall be noted that other fabric services/directors may be used); and one or more orchestrators 140.

In one or more embodiments, the NVMe™ entities 130 may include one or more hosts (e.g., host 132b), one or more storage elements (e.g., storage items 132a and 132n), or both. As depicted in FIG. 1, these devices are communicatively coupled to the network fabric 110. A host may be an NVMe™ server or any other suitable type of computing device that is capable of accessing data stored in a storage element (e.g., one or more of the storage elements 132a and 132n) via the network fabric 110. A storage element (e.g., storage element 132a and/or 132n) may be an NVM subsystem (the terms storage element and NVM subsystem may be used interchangeably herein), which may be implemented as a storage array, multiple NVMe-oF™ drives, storage volume, namespace, logical unit number (LUN), extent, disk, or the like. It is noted that the system 100 may include any number of NVMe™ hosts and/or NVM subsystems 130.

In one or more embodiments, the StFS 102 may reside on a computing device or devices of the network fabric 110, including on one or more virtual machines operating within or attached to the network fabric 110; however, it shall be noted that the StFS 102 may reside within any other suitable components in the system 100. In one or more embodiments, the StFS 102 may include one or more Application Programming Interfaces (APIs) 104 and be communicatively coupled to one or more orchestrators 140, in which the orchestrators 140 may include (but are not limited to) workflow orchestrator 141, container orchestrator 142, Software Defined Storage (SDS) orchestrator 143, and composition orchestrator 144. In one or more embodiments, these orchestrators are management & orchestration software systems, such as (by way of example and not limitation) Kubernetes, VMware's vROPS (vRealize Operations).

In one or more embodiments, one or more of the orchestrators 141-144 are instantiated as services that run within a container, as part of a virtual machine (VM), or as a stand-alone service or application running on a bare metal server platform. In one or more embodiments, the workflow orchestrator (e.g., vRealize Operations (vROps), StackStorm, and Ansible Tower) is responsible for coordinating the discrete steps that are performed as a part of automating a given system configuration process. In one or more embodiments, the workflow orchestrator performs a configuration step, checks that the step completed successfully, and then performs the next configuration step (which may involve using information retrieved from the system after a prior configuration step or steps). A workflow orchestrator may also support a rewind function in case one or more of the steps fail.

In one or more embodiments, the container orchestrator (e.g., Kubernetes) is responsible for managing the lifecycle of any containers, which may include managing connections to persistent storage (e.g., Container Storage Interface (CSI)).

In one or more embodiments, the SDS orchestrator handles configuration of as well as overall monitoring of system resources used to create storage volumes from server resident storage capacity.

In one or more embodiments, the composition orchestrator uses the inventory of discrete system resources (e.g., CPU, memory, GPU, Smart NICs) to create composable hardware (HW) appliances. These composable HW appliances may be created from components that reside in either the same server chassis or from physically separate server chassis (e.g., CPU from system A, memory from system B, GPU from system C, etc.).

In one or more embodiments, the fabric service/director 120 may include one or more APIs 122 and may be communicatively coupled to the StFS 102, orchestrators 140, and the network fabric 110. In one or more embodiments, the fabric service/director 120 may be a controller that automatically configures a cluster of switches in the network fabric 110. In one or more embodiments, the fabric service/director 120 may perform various functions, such as discovery, transport, lifecycle, fabric and automation.

Figure 2:
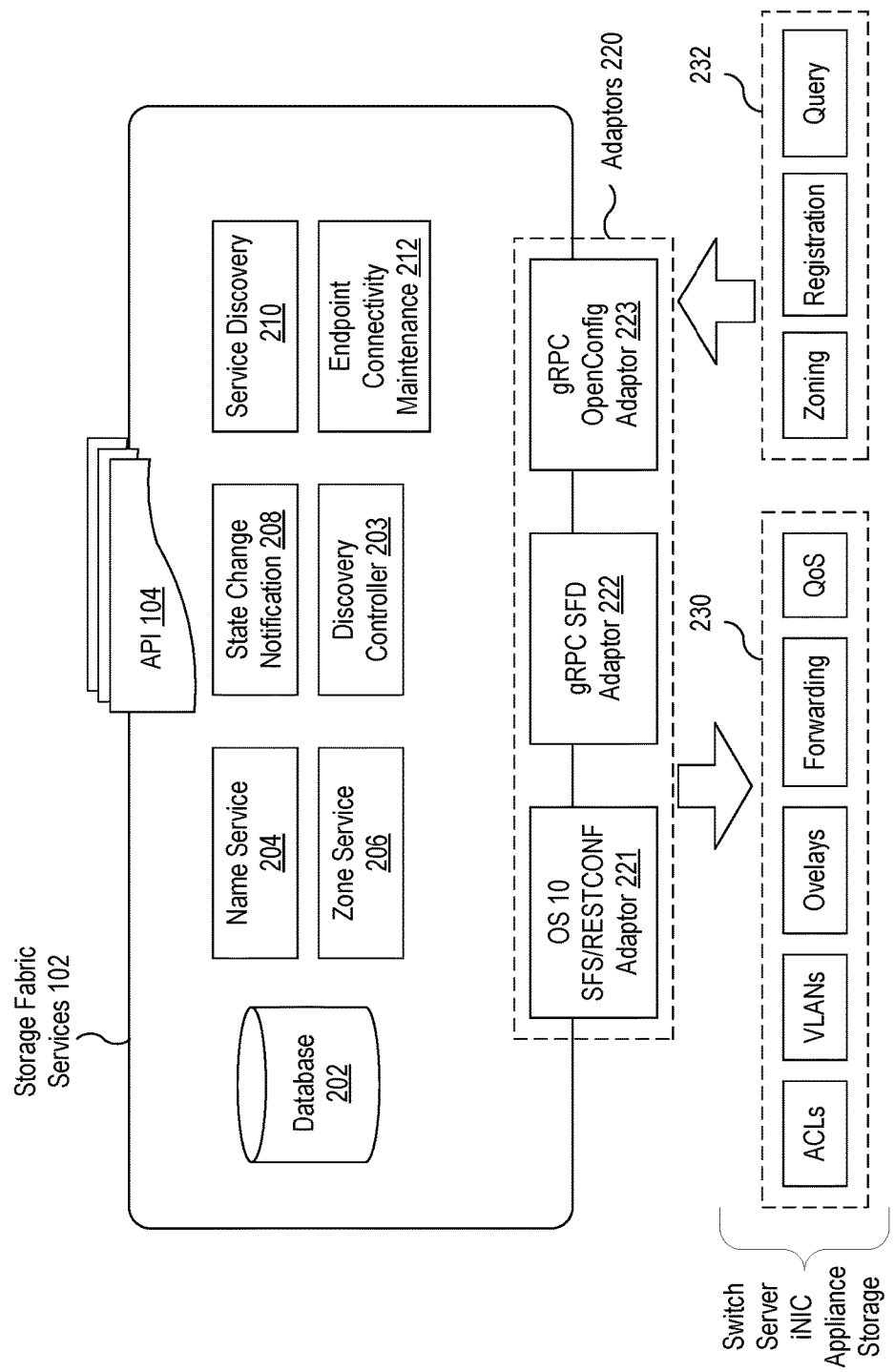
FIG. 2 depicts a Storage Fabric service (StFS), according to embodiments of the present disclosure.

FIG. 2 graphically depicts an StFS 102, according to embodiments of the present disclosure. As depicted, the StFS 102 may include: a data store 202 (such as name database, name DB, in FIG. 1) for storing data, which may include storing and retrieving registration data; the APIs 104, including APIs for interfacing with one or more of the north-bound elements 140; and one or more adaptors 220 for communicating data with or to various network components, such as switch, server, Smart Network Interface Controller (Smart NIC), Network Interface Controller (NIC), appliance and storage. As shown in FIG. 1, in one or more embodiments, the StFS 102 may perform various functions: discovery of NVMe™ transport specific information, storing/retrieving registration information in/from the name database, and generating asynchronous events (e.g., Asynchronous Event Notifications (AEN)). In one or more embodiments, zoning may be supported in which the scope of discovery for a device may be limited, and zoning can act as a coarse grained (e.g., network interface level) access control mechanism and/or load balancing.

In one or more embodiments, the adaptors 220 communicate with network devices (e.g., switches and other fabrics devices). In one or more embodiments, the adaptors may include, but are not limited to, OS 10 SmartFabric Services (SFS)/REST adaptor 221, gRPC SmartFabric Director adaptor 222, and gRPC open configuration (OpenConfig) adaptor 223. In one or more embodiments, the adaptors 220 may send data 230, such as Access Control List (ACLs), virtual Local Area Networks (VLANs), Overlays, Forwarding, and Quality of Service (QoS). In one or more embodiments, the adaptors 220 may receive data 232, such as zoning information, registration (which discussed herein), and query data.

In one or more embodiments, the StFS 102 may perform various functions including but not limited to: name service 204 for storing and retrieving registration data in/from the database (or data store) 202; zone service 206, which were as discussed above; asynchronous events (e.g., Asynchronous Event Notifications (AEN) or State Change Notification (SCN)) 208 for notifying a change in status of an NVMe™ entity (i.e., an NVMe™ host or an NVM subsystem) or any of its elements (an element of an NVMe™ entity may refer to an entire device or component (e.g., such as an NVMe™ host or an NVM subsystem) or may refer to a subset or subcomponent (e.g., an interface, a port, an agent, or a controller of an NVMe™ host or an NVM subsystem); service discovery 210 for discovering an NVMe-oF™ communication endpoint for TCP/IP or UDP/IP (which may include: an Internet Protocol (IP) address, a Transmission Control Protocol (TCP) or User Datagram Protocol (UDP) port (and indication of which protocol is used with the port), or an NVMe-oF™ transport protocol (e.g., TCP, RoCEv2, or RDMA)); and endpoint connectivity maintenance 212 for maintaining connectivity to elements of an NVMe™ entity.

It shall be noted that the StFS may provide a number of beneficial services. First, in one or more embodiments, concerning an EBOF (Ethernet-attached Bunch of Flash products) configuration server, the StFS may provide a configuration repository for the EBOF products, which may be an NVMe™ drive enclosure containing multiple NVMe™ drives that can be connected to via Ethernet. In one or more embodiments, when an EBOF product comes online, it pulls its NVMe™ layer configuration (e.g., name space masking/mapping to hosts) from the configuration repository. This avoids the need for more complicated EBOF hardware, as well as decreases the need for users to interact with an embedded management application reside on the EBOF product.

Second, in one or more embodiments, concerning StFS Traffic Engineering Service, a StFS can consume telemetry information from NVMe™ hosts, NVM subsystems, and the fabric to detect hot spots (e.g., trouble areas, high traffic areas, down elements, etc.), drops and in the case of RoCE, congestion spreading, etc. It should be noted that references to RoCE herein are referring to RoCEv2 or other implementations or protocols with the same or similar functionality. A traffic Engineering Service may use this information to generate Explicit Congestion Notification packets to reduce the impact of these events in real time, as well as generate bandwidth/IO limits to prevent recurrence.

Third, in one or more embodiments, StFS can serve as a zoning attributes repository. Zoning functionality enables two or more NVMe™ entities to communicate with one another, and zoning attributes may be used to define how the devices communicate with each other. This information may be read by any of the elements participating (e.g., host, storage, switch in the fabric, etc.) to allow each to self-configure based on the attributes. For example:

a. Quality of Service (QoS)—QoS attributes specify performance aspects of communication among NVMe™ entities. In one or more embodiments, these attributes may include, but are not limited to, minimum and maximum values for bandwidth and latency. These values may be used by the Fabric to ensure that the flow uses the appropriate route, or by the storage to ensure that the appropriate class of storage media is used, or by the host to allow it to check whether the response time that it is experiencing is expected.

b. Transport—depending on the requirements of the application, a specific transport (e.g., RoCE, TCP) may be desired. It should be noted that transport is an NVMe-oF™ communication endpoint characteristic, and typically all the endpoints in a zone use the same transport.

c. Isolation—it may be desirable in some cases to specify that a particular set of NVMe-oF™ end devices should be isolated to their own VLAN or Virtual Network Instance.

Fourth, in one or more embodiments, StFS can provide an embedded key management service for authentication and end-to-end encryption keys.

Figure 3:
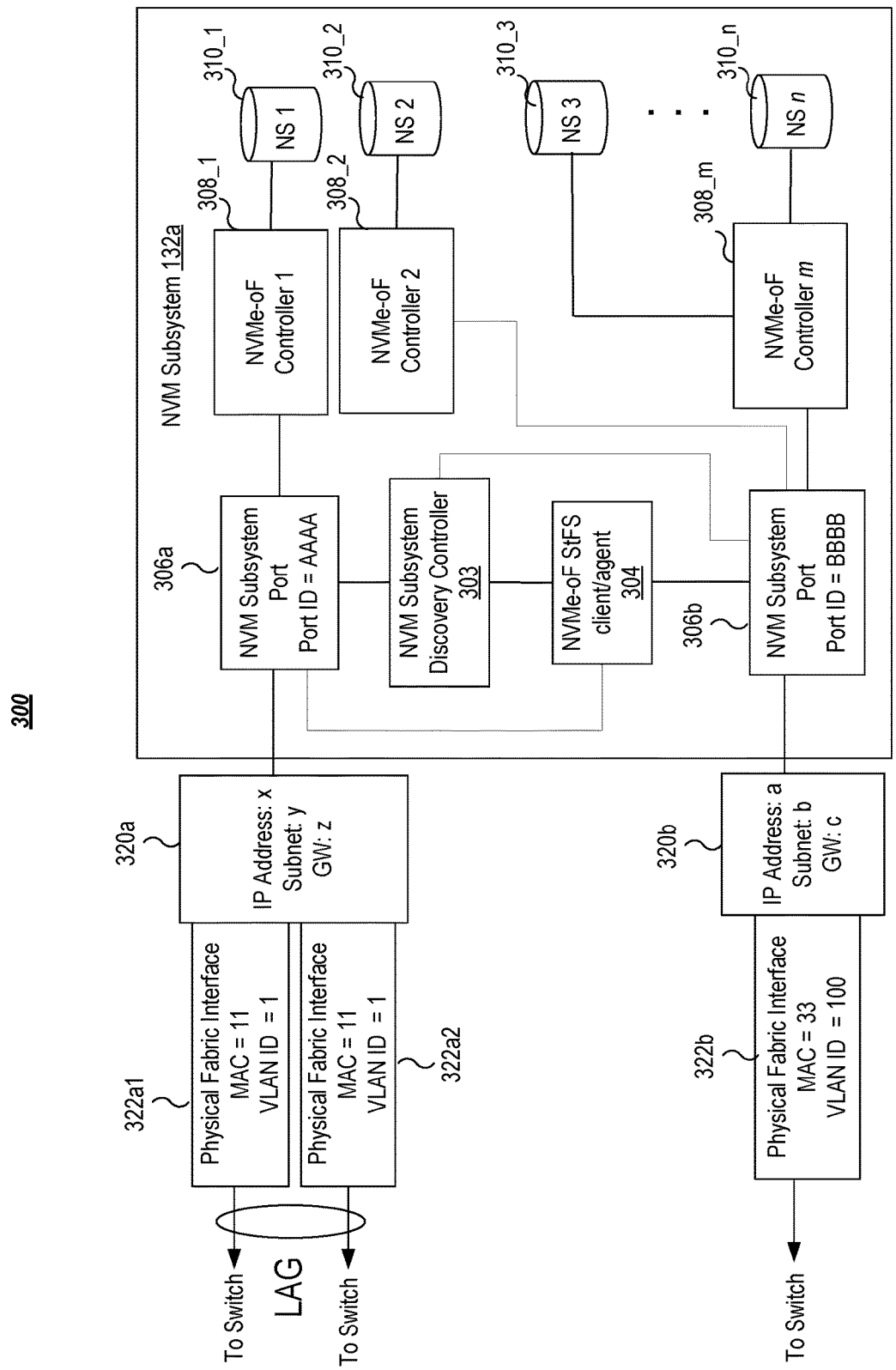
FIG. 3 depicts an NVM subsystem, according to embodiments of the present disclosure.

FIG. 3 depicts an NVM subsystem 132*a*, according to embodiments of the present disclosure. It shall be noted that the depicted NVM subsystem is an example provided to help facilitate the disclosure and that other NVM subsystem configurations may also be used. As depicted, the NVM subsystem 132*a* may include: one or more storage volumes 310_1-310_*n*; one or more NVMe-oF™ controllers 308_1-308_*m* that are communicatively coupled to and control data flow to/from the storage volumes 310_1-310_*n*; one or more NVM subsystem ports 306*a* and 306*b* through which the NVMe-oF™ controllers 308_1-308_*m* communicate data via the network fabric 110; an NVMe-oF™ discovery controller 303 communicatively coupled to the NVM subsystem port 306a and 306b; and NVMe-oF™ StFS client (which may also be referred to herein as an StFS agent) 304. While not illustrated in FIG. 3, it shall be noted that the NVM subsystem may comprise more connections between the NVMe-oF™ controllers 308_1-308_m and the storage volumes. For example, there may be m×n connectivity between the NVMe-oF™ controllers 308_1-308_m and the storage volumes 310_1-310_n. As illustrated in FIG. 3, the NVM subsystem ports (e.g., ports 306a and 306b) may be communicatively coupled to physical fabric interfaces (e.g., interfaces 322a1-322a2 and 322b), which are or provide communicative coupling to the network fabric 110.

In one or more embodiments, the NVM subsystem controllers 308_1-308_m provides access to the storage volumes 310_3-310_n, which may be realized as one or more NVMe namespaces. In one or more embodiments, namespaces are attached to controllers and/or controllers provide access to attached namespace. While not illustrated in FIG. 3, it shall be noted that the NVM subsystem 132a may comprise a set of NVMe-oF controllers 308_x per port. In one or more embodiments, each NVM subsystem port may have associated with it a port identifier (portID), an IP address, a subnet address, a gateway address, and a Media Access Control (MAC) address. Also, in one or more embodiments, a physical fabric interface may have a VLAN ID. In one or more embodiments, when dealing with trunked interface in which a physical port is on multiple VLANs, an implementation may comprise an StFS instance per relevant VLAN. In one or more embodiments, the NVMe™ hosts and NVM subsystems 130 may use Ethernet-based transports, such as, but not limited to, NVMe-oF™/TCP 166 or NVMe-oF™/RoCE 168. In one or more embodiments, to resolve problems associated with the conventional NVMe-over-Ethernet transports, each NVMe™ entity may include an StFS client/agent (such as agent/client 133 and 304) that communicates to the StFS 102 so as to perform registration of data associated with an NVMe™ host or NVM subsystem element or elements with the StFS 102. In one or more embodiments, the data associated with an element of an NVMe™ host or NVM subsystem may include one or more of the following: attribute(s), setting(s), characteristic(s), property/properties. For example, this data may include transport interface information that relates to access control of an element. As used herein, an element may refer to an entire device or component (e.g., such as an NVMe™ host or an NVM subsystem) or may refer to a subset or subcomponent (e.g., an interface, a port, an agent, or a controller of an NVMe™ host or an NVM subsystem). In one or more embodiments, this data is provided by the StFS agent (133 and 304) to the StFS to be stored in the data store 202.

In one or more embodiments, upon receipt of a query from an NVMe™ host or NVM subsystem (e.g., from an StFS agent of an NVMe™ host or NVM subsystem), the StFS 102 may provide the transport information stored in the data store 202 for the NVMe™ host or the NVM subsystem so that the NVMe™ host or the NVM subsystem is able to discover IP addresses (e.g., 320b) and supported protocols of elements of other NVMe™ hosts or NVM subsystems that it can access. In one or more embodiments, the StFS 102 may operate as a centralized discovery service so that each NVMe™ host or NVM subsystem may discover a list of other elements of NVMe™ hosts or NVM subsystems for which connections can be established to enable data transfers via the network fabric 110.

In one or more embodiments, the StFS 102 may publish its existence to NVMe™ hosts and NVM subsystems (e.g., items 130) in a system, thereby enabling the NVMe™ hosts and NVM subsystems to register their transport information with the StFS 102. In one or more embodiments, the NVMe™ hosts and NVM subsystems may automatically discover the existence of the StFS 102 via service discovery records, such as Domain Name Service-Service Discovery (DNS-SD) records, which may in turn may be retrieved by suing a multicast Domain Name System (mDNS) protocol or another DNS protocol.

In one or more embodiments, when either NVMe-oF™ over TCP or NVMe-oF™ over another IP-based protocol (e.g., RoCE, iWARP, etc.) is used in the system 100, before a NVMe™ host can discover the storage resources (or, namespaces) that have been allocated to the host in the NVM subsystems, the host may first discover the accessible NVM subsystem transport interfaces (e.g., 320a and 320b) behind which the namespaces have been provided. In contrast to conventional systems that do not specify initial discovery, in one or more embodiments, the agent (e.g., agent 133) of the host may send a query to the transport information that is stored in the data store 202 to the StFS 102, and, using the transport information received from the StFS 102, the host may be able to discover all of the NVM subsystems (or transport interfaces) that the host is allowed to access, reducing the usage of system resources to discover the accessible storages resources.

Figure 4:
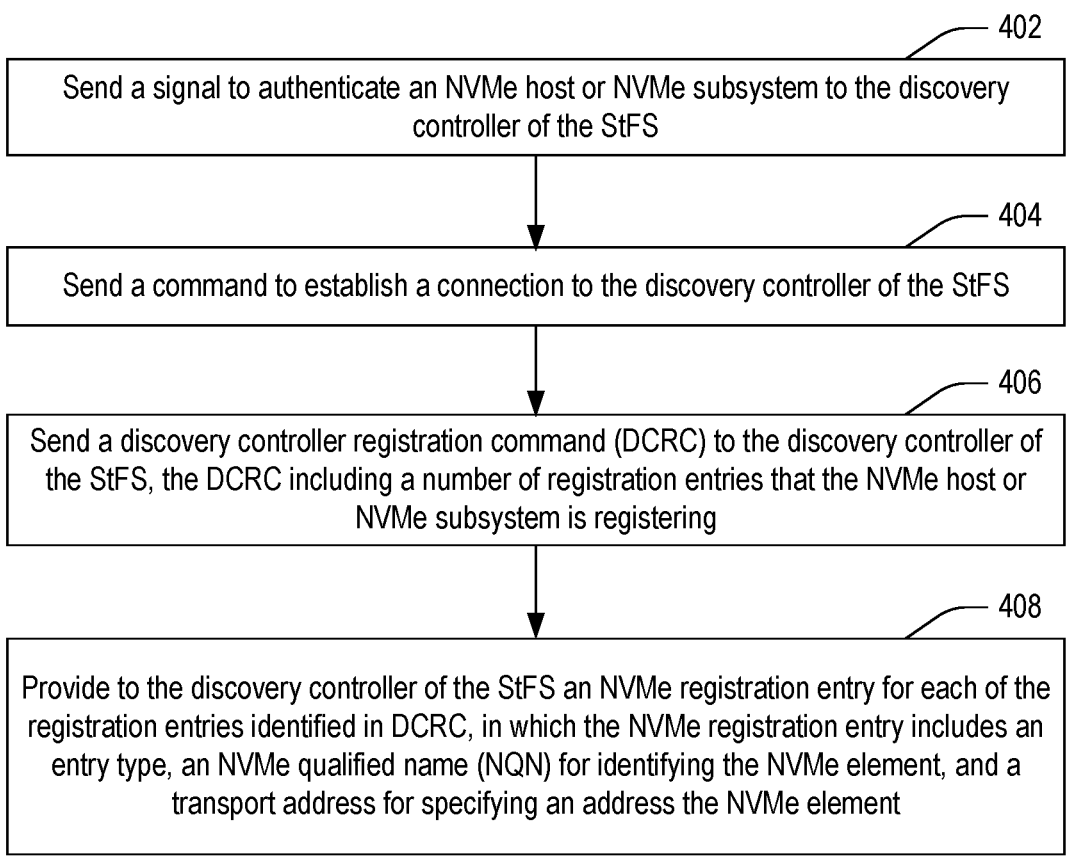
FIG. 4 depicts a flowchart of an exemplary method for registering an NVMe™ element of an NVMe™ host or NVM subsystem via a discovery controller of an StFS, according to embodiments of the present disclosure.

In one or more embodiments, before an NVMe™ host or NVM subsystem sends a query for transport information to the StFS 102, the NVMe™ host or NVM subsystem registers its transport information with the StFS 102. FIG. 4 depicts a flowchart 400 of an exemplary method for registering the transport information of one or more elements of an NVMe™ host or NVM subsystem with the StFS 102, according to embodiments of the present disclosure.

As depicted in the embodiment in FIG. 4, the NVMe™ host or NVM subsystem sends a command (e.g., a Fabric Connect command) (402) to establish a communication connection to the StFS 102. In one or more embodiments, authentication may be required before actual discovery is performed. In one or more embodiments, an NVMe™ entity (e.g., an NVMe™ host or NVM subsystem) may send (404) a security signal (which may be for authentication, authorization or both) to a centralized storage fabric service (e.g., the StFS) via the discovery controller 103. A signal may be used to authenticate the NVMe™ host or NVM subsystem to the centralized storage fabric service. Upon proper authentication, privileges may be authorized; such as, for example, permission to register discovery information or access to a namespace. In one or more embodiments, an StFS agent (e.g., 133 or 304) of the NVMe™ host or NVM subsystem may perform this function. In one or more embodiments, the command may include sending a Fabric Connect command, which includes an indicator identifying whether the sender is a host or a subsystem. The indicator may be implemented as a CATTR (Connect Attributes) bit or bits, in which one indicator (e.g., 0b) indicates that the connection is being initiated by a NVMe™ host and another indicator (e.g., 1b) indicates that the connection is being initiated by an NVM subsystem. In one or more embodiments, if the indicator is that of an NVMe™ host, data may be communicated indicating additional information, such as a host identifier (host ID) and an NVMe™ Qualified Name (NQN), which is used to uniquely designate an NVMe™ host or NVM subsystem for various purposes such as identification and authentication; and if the indicator is that of an NVM subsystem, data may be communicated indicating additional information, such as a subsystem NQN (SUB NQN). In one or more embodiments, the system may include a command specific status code that is defined to acknowledge successful processing of the indicator (e.g., the CATTR bit(s)).

Figure 7:
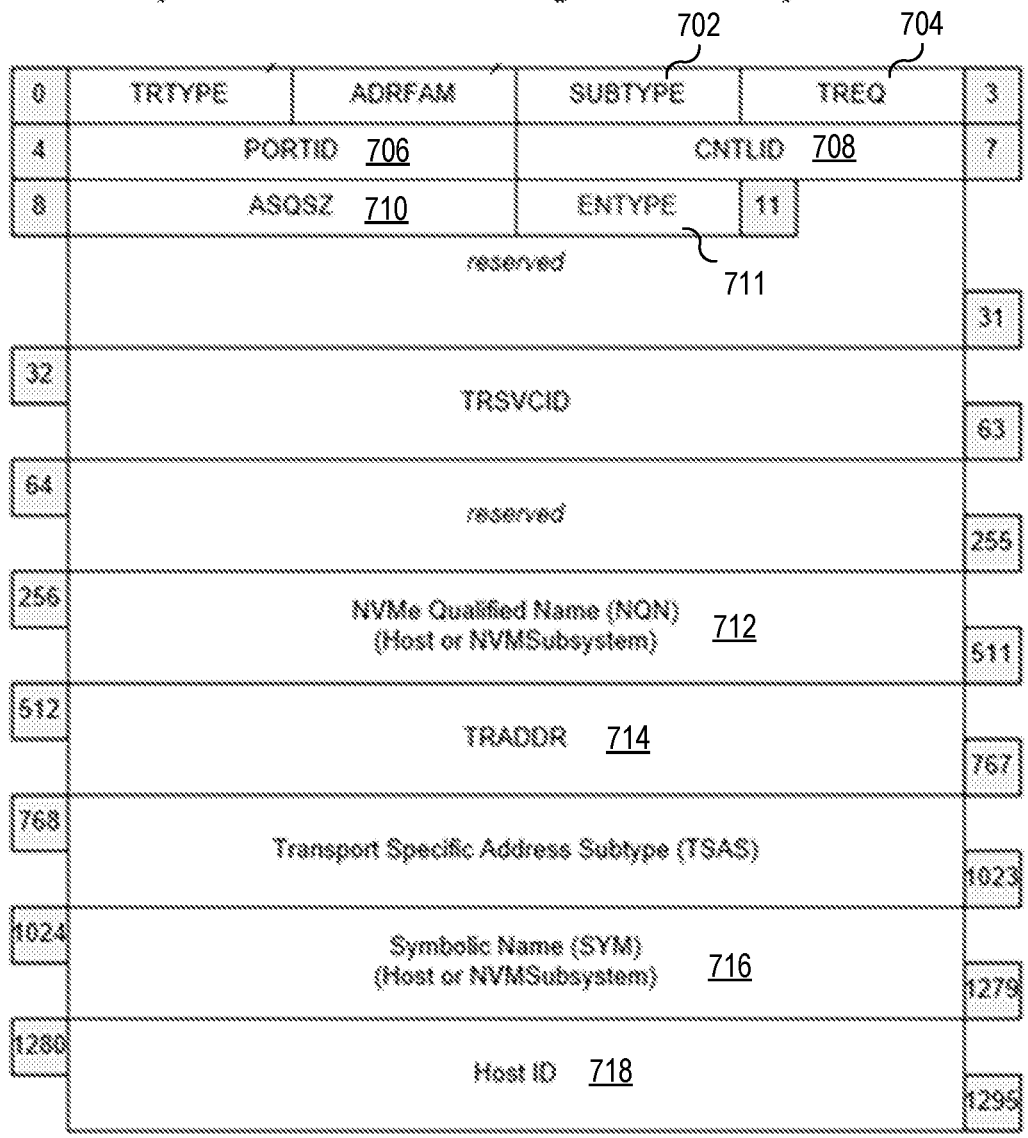
FIG. 7 depicts an NVMe-oF™ registration entry in FIG. 6 according to embodiments of the present disclosure.

Returning to FIG. 4, the StFS agent may send (406) a discovery controller registration command (DCRC) to the discovery controller 103 of the StFS, wherein the DCRC includes a number of registration entries that the NVMe™ host or NVM subsystem is registering. In one or more embodiments, the discovery controller of the StFS is provided (408) with a number of NVMe™ registration entries corresponding to the number in the DCRC. In one or more embodiments, an NVMe™ registration entry includes an entry type, an NVMe™ qualified name (NQN) for identifying the NVMe™ element, and a transport address for specifying an address for the NVMe™ element. An example of an NVMe™ registration entry is depicted in FIG. 7, below.

FIG. 5 depicts an example discovery controller registration command (DCRC) 500, according to embodiments of the present disclosure. As depicted in FIG. 5, a discovery controller registration command may include a number of fields, including fields CDW10 505 and CDW11 510. In one or more embodiments, command 505 includes record format information, which specifies the format of the discovery controller registration command, and command 510, which specifies the number of discovery controller registration entries that are being provided by the NVMe™ host or NVM subsystem to be registered with the discovery controller/StFS. It shall be noted that other fields may be present (e.g., Opcode (identifies the command to be executed by the discovery controller), NameSpace Identifier (NSID) (identifies the namespace or storage volume involved), Command Identifier (CID) (specifying a unique identifier for the command), Data Pointer (DPTR) (contains a Scatter-Gather List (SGL) Entry (alternatively, an SGL list that comprises one SGL entry) that tells the Fabric/Transport how to transfer the data for the command, e.g., the registration entries), among other possible field). In one or more embodiments, the discovery controller registration command may be of the form of an Admin command, such as described in the NVM Express™ Base Specification Rev. 1.4 (which is incorporated herein by reference in its entirety), which is produced by the NVM Express™ organization—a non-profit consortium of technology industry leaders. It shall be noted that other types and formats of command may be employed.

As noted above, at step 406, there is an identifier (e.g., indicator 510) that indicate the number of discovery controller registration entries that are being provided by the NVMe™ host or NVM subsystem. In one or more embodiments, the NVMe™ host or NVM subsystem has corresponding discovery controller registration data comprising an NVMe™ registration entry for the corresponding number of elements. In one or more embodiments, each NVMe™ registration entry may correspond to a single physical interface that has an IP address. By way of example and not limitation, assume NVM subsystem 132a has two elements it seeks to register (e.g., the two NVM subsystem ports 306a and 306b, which are respectively associated with IP addresses 320a and 320b). In this example, the identifier (e.g., indicator 510) will be set to the value "2."

In one or more embodiments, an NVM subsystem may include one or more NVMe-oF™ discovery controllers (e.g., discovery controller 303, as shown in FIG. 3). When a host queries the transport information of the NVM subsystem, the NVMe-oF™ discovery controller may provide the transport information of the NVM subsystem ports or subsystem controllers. However, in one or more embodiments, the NVM subsystem controllers (e.g., NVM subsystem controllers 308_1-308_m) cannot register their transport information with the NVMe-oF™ discovery controller. Instead, as discussed above, the StFS agent (e.g., StFS agent 304) may register the transport information of the NVM subsystem controllers (e.g., NVM subsystem controllers 308_1-308_m) and/or the NVM subsystem discovery controller (e.g., NVM subsystem discovery controller 303) with the StFS.

Upon receiving the discovery controller registration data 600 from the NVMe™ host or NVM subsystem, the StFS 102 stores the received information (e.g., stores the information in data store 202). Given the stored discovery controller registration data, the StFS 102 may function as a central discovery controller of a system (e.g., system 100).

Figure 6:
FIG. 6 depicts discovery controller registration data, according to embodiments of the present disclosure.

FIG. 6 depicts a discovery controller registration data format 600, according to embodiments of the present disclosure. As depicted, the discovery controller registration data format 600 includes one or more data blocks 602A-602n, where each data block includes data for an NVMe™ registration entry and the number n relates to the identifier (e.g., indicator 510) in the discovery controller registration command (DCRC). For example, if the number of entries identified in the discovery controller registration command is m then there will be 0 through n entries 602, in which n=m−1.

FIG. 7 depicts an embodiment of an NVMe™ registration entry (e.g., 602x in FIG. 6), according to embodiments of the present disclosure, which may be registered with a discovery controller/StFS. It shall be noted that the NVMe™ registration entry embodiment in FIG. 7 is only one example and that different configurations/layout, different fields (or parameters), and different data field sizes may be used. It shall also be noted that the data format of the discovery controller registration data 600 may be used by a host or a subsystem. In one or more embodiments, the NVMe™ registration entry 700 may include such parameters as:

(1) Transport Type (TRTYPE), which specifies the NVMe™ Transport type;

(2) Subsystem Type (SUBTYPE), which may include an indicator of the type of the NVM subsystem (e.g., a Discovery subsystem or an NVM subsystem) or whether it is an NVM subsystem at all;

(3) Transport Requirements (TREQ), which may be used to indicate whether authentication is required and may distinguish transport requirements between an NVMe™ host and an NVM subsystem;

(4) Entity Type (ENTYPE), which may indicate the type of NVMe™ entity (e.g., a first value may indicate that the NVMe™ entity is not specified; a second value may indicate that the NVMe™ entity is an NVM subsystem; and a third value may indicate that the NVMe™ entity is an NVMe™ Host;

(5) NVM Qualified Name, which indicates: (a) for NVM subsystems, the NVM Subsystem Qualified Name (SUBNQN) that uniquely identifies the NVM subsystem, and (b) for NVMe™ hosts, the NVMe Qualified Name (NQN) that uniquely identifies the host system;

(6) Transport Address (TRADDR), which indicates: (a) for NVM subsystems, the address of the NVM subsystem port that may be used for a connect command, and (b) for NVMe™ hosts, the address of the host interface that will be used to connect to NVM subsystem or to a controller on the NVM subsystem;

(7) Transport Specific Address Subtype (TSAS), which specifies additional information about the transport address of item (6) (above);

(8) Symbolic Name (SYM), which specifies a Symbolic Name of the NVMe™ host or NVM subsystem (which may be specified as an ASCII or Unicode string). In one or more embodiments, an Address Family field describes the reference for parsing this field; and (9) Host Identifier (HOSTID), which is used for NVMe™ hosts and may have the same definition as the Host Identifier defined in the "Host Identifier" section of the NVMe™ Base specification, which is incorporated by reference herein.

Figure 8:
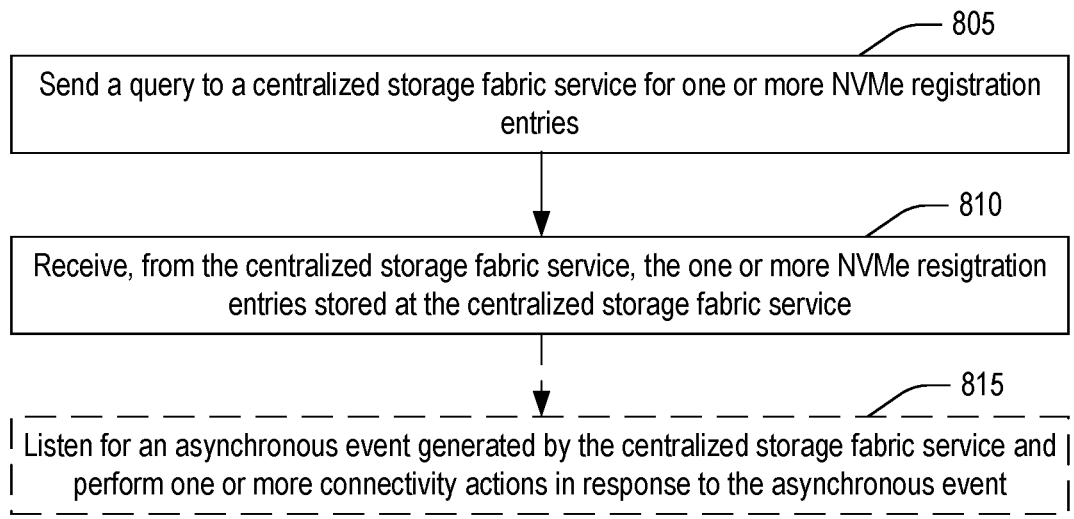
FIG. 8 depicts a method in which an NVMe™ host or an NVM subsystem may obtain information that has been registered with a centralized Storage Fabric service (StFS), according to embodiments of the present disclosure.

FIG. 8 depicts a method in which an NVMe™ host or an NVM subsystem may obtain information that has been registered with a centralized storage fabric service, according to embodiments of the present disclosure. In one or more embodiments, an NVMe™ host or NVM subsystem may send (805) a query to a centralized storage fabric service (e.g., StFS 102) to discover zero or more NVMe™ registration entries (such as, transport specific information) associated with an NVMe™ element. In one or more embodiment, the NVMe™ host or NVM subsystem may receive one or more NVMe™ registration entries from the centralized storage fabric service in response to the query. For instance, the host 132b (or the StFS agent 133) may send the query 162 to the StFS 102 to discover NVMe™ registration entries (such as transport specific information) associated with the NVM subsystems that the host 132b has been granted access to. Upon receiving the query from the host 132b, the StFS 102 may retrieve and return (810) the NVMe™ registration entry stored in the data store 202. In another example, the StFS agent 304 may send a query to the StFS 102 to discover a NVMe™ registration entry associated with the NVMe™ hosts that may potentially be allowed to access one or more namespaces associated with the NVM subsystem 300. Upon receiving the query, the StFS 102 retrieve and returns (810) the relevant NVMe™ registration entry or entries stored in its data store.

In one or more embodiments, the StFS may perform other functions. For instance, in one or more embodiments, a controller that is part of either an NVMe™ host or an NVM subsystem may listen for an Asynchronous Event Notification (AEN) generated by the StFS and perform one or more connectivity actions, one or more discovery actions, or both in response to the asynchronous event.

Figure 9:
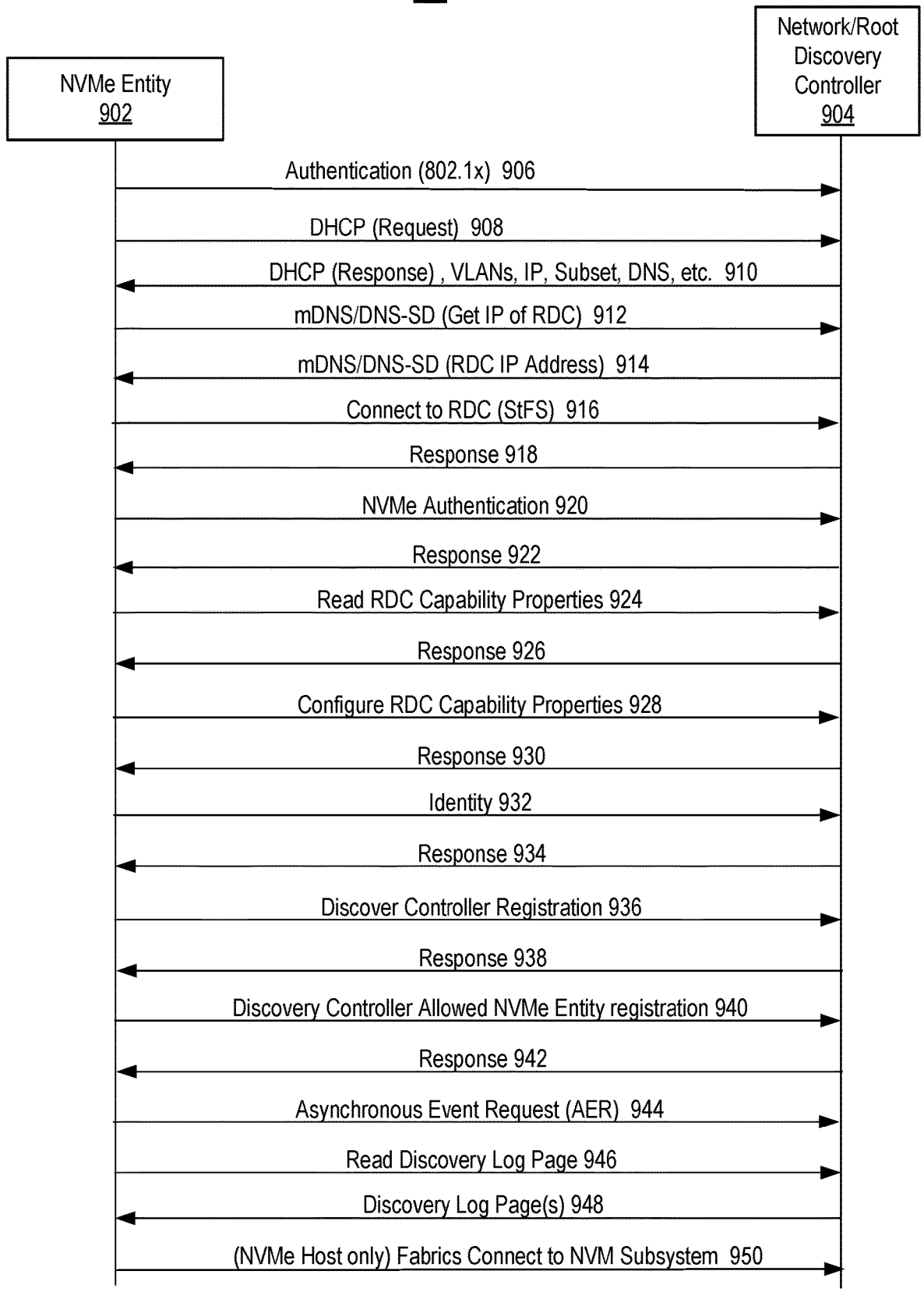
FIG. 9 depicts a flowchart of an exemplary method for communication between an NVMe™ entity and an StFS according to embodiments of the present disclosure.

FIG. 9 depicts a flowchart 900 of an exemplary method for interaction between an NVMe™ entity and an StFS according to embodiments of the present disclosure. The following sequence diagram illustrates various interactions, including how discovery controller registration may be used to interact with the StFS service. Recall that the terms "Root Discovery Controller," "RDC," and "StFS" may be treated as synonyms.

The first interaction, step 906, comprises IEEE 802.1x authentication by an NVMe™ Entity 902, which may be a NVMe™ Host or NVM subsystem, to a network/RDC 904. In one or more embodiments, this interaction may be optional.

The next interaction 908-910 depicts an interface configuration and VLAN discovery process. In one or more embodiments, this interaction may be optional.

A Root Discovery Controller is obtained via the discovery process depicted at steps 912-914. In one or more embodiments, this interaction may be optional.

Steps 916-918, represent the NVMe™ entity 902 connecting to the Root Discovery Controller. In one or more embodiments, the Fabric Connect protocol may be used.

An NVMe-oF™ authentication interaction is depicted at steps 920-922. In one or more embodiments, this interaction may be optional.

A Root Discovery Controller configuration process is illustrated in steps 924-934.

The next interaction 936-938 depicts a Discovery Controller registration process. In one or more embodiments, this interaction may be optional for NVMe™ hosts. A Discovery Controller allowed NVMe™ entity registration process is depicted in steps 936-938. In one or more embodiments, this interaction may be optional for NVM subsystems. It shall be noted that a benefit of discovery controller registration processes is that one command format may be used by all end points.

Steps 940-948 depict an example Allowed NVMe™ Entity Registration (ANER) interaction, which may, in embodiments, be a Target Driven Zoning process. Embodiments of Target Driven Zoning are discussed in more detail in the next section. In one or more embodiments, step 946 allows an NVMe™ Host or an NVM subsystem to determine the IP Address that should be used to communicate with the other NVMe-oF™ capable systems.

Finally, step 950 depicts, for NVMe™ hosts, establishing end-to-end connectivity and performing NVMe™ discovery of namespaces.

In one or more embodiments, upon registering the transport information with the centralized storage fabric service, a host or subsystem (which should be understood to mean the host or subsystem or its StFS agent) may perform various functions. In one or more embodiments, an NVMe™ host or NVM subsystem may register or deregister transport information of one or more other elements, using either in-band or out-of-band create, read, update, and delete (CRUD) operations. In one or more embodiments, as discussed above, a host may send a query to the centralized storage fabric service to discover the transport specific information associated with an NVM subsystem or subsystems to which the host has been granted access. Also, in one or more embodiments, the StFS agent may modify the namespace access control mechanism of its NVM subsystem to allow one or more NVMe™ hosts to access the specific namespaces. In one or more embodiments, the StFS agent may publish a list of the NVMe™ hosts that have been granted access to a particular NVM subsystem interface (e.g., 320a) to the StFS. Also, in one or more embodiments, an NVMe™ host or NVM subsystem may modify the NVMe-oF™ connectivity information of one or more of its elements and may also establish connectivity to another element in the system using the best protocol supported by both elements. In one or more embodiments, an StFS agent may update its host NVMe™ multipathing information and register the updated information with the StFS. Also, in one or more embodiments, the StFS agent may listen for asynchronous events generated by the StFS and perform connectivity action(s) based on those events.

In one or more embodiments, an NVMe™ host or an NVM subsystem may deregister one or more elements with the centralized storage fabric service. In one or more embodiments, deregistration may be performed in a similar manner and using similar data formats as registration. For example, a discovery controller deregistration command may be an admin command similar to that depicted in FIG. 5. Similarly, the deregistration entry may be similar to that depicted in FIG. 7. One skilled in the art shall recognize, however, that all the same fields used in registration may not be supplied for deregistration. For example, symbolic name may not be included in the discovery controller NVMe™ deregistration entry.

C. Target Driven Zoning for Ethernet (eTDZ) Embodiments

The prior section presented embodiments that facilitated registration with a centralized root discovery controller. Embodiments herein provide mechanisms to help limit the scope of discovery for end devices via zoning. In Fibre Channel (FC) environments, zoning is typically used for two main purposes: (1) for access control to ensure only authorized hosts can access storage subsystem resources; and (2) to reduce the load on a FC Name Server—that is, when zoning is used, the total number of name server queries that need to be handled by the switch can be dramatically reduced. For example, without zoning, the number of commands that may need to be serviced by the switch increases non-linearly, roughly 2n×(n−1) (where n=the number of N_Ports visible to each end device).

Thus, for at least these reasons, zoning is beneficially provided in systems even when the transport is Ethernet based. However, one of the problems with zoning is that it places an administrative burden on users for CRUD zoning definitions as the connectivity needs of the environment change (i.e., manually grouping pairs of end devices together via a transport layer identity) (e.g., zoning by World Wide Port Names (WWPN) in FC). To address these issues, embodiments of target driven zoning for Ethernet (eTDZ) have been developed and are presented herein.

To apply target driven zoning principles to Ethernet, one must consider that access control information (i.e., zoning) with NVMe-oF™ is not symmetrical. In other words, unlike with FC where each end device can be solely identified by the same type of identifier (e.g., Port_Name), NVMe-oF™ typically require specific identifiers for each NVMe™ entity element.

Thus, in one or more embodiments, NVMe™ hosts may be identified by a combination of one or more identifiers (e.g., their "HOSTNQN" and "HOSTID"), and NVM subsystems may similarly be identified by a combination one or more of their identifiers (e.g., "SUBNQN")—although different identifiers may be additional or alternatively used. Once these values and the relationships between them have been provided to the StFS, it may use the information provided for a number of functions, including but not limited to:

(1) limit the number of entries returned to each NVMe™ entity in response to a request (e.g., a Get Log Page request). In one or more embodiments, the entries returned to the NVMe™ entity may be limited to those entries to which the NVMe™ entity has been granted access. Embodiments of this approach may be considered to be analogous to soft zoning enforcement with FC; and (2) update Access Control Entries (ACEs) on the switch interfaces to prevent an NVMe™ entity from accessing a resource to which it has not been granted access. Embodiments of this approach may be considered to be analogous to hard zoning enforcement may be performed via a combination of the IP Address and the protocol number in use by the end devices.

Regardless of the enforcement mechanism (i.e., soft or hard zoning), traditionally the relationships between the relevant elements of the NVMe™ entities had to be configured on the switches; and typically, this has been done via a fabric management application or switch element manager in order to configure these relationships explicitly. However, as mentioned earlier, this manual zoning processing places a significant burden on users, particularly if the network is large, changes frequently, or both. Accordingly, embodiments herein mitigate these problems by allowing an NVMe™ subsystem to publish a list of the NVMe™ hosts that have been granted access to namespaces behind a given NVM subsystem interface.

Figure 10A:
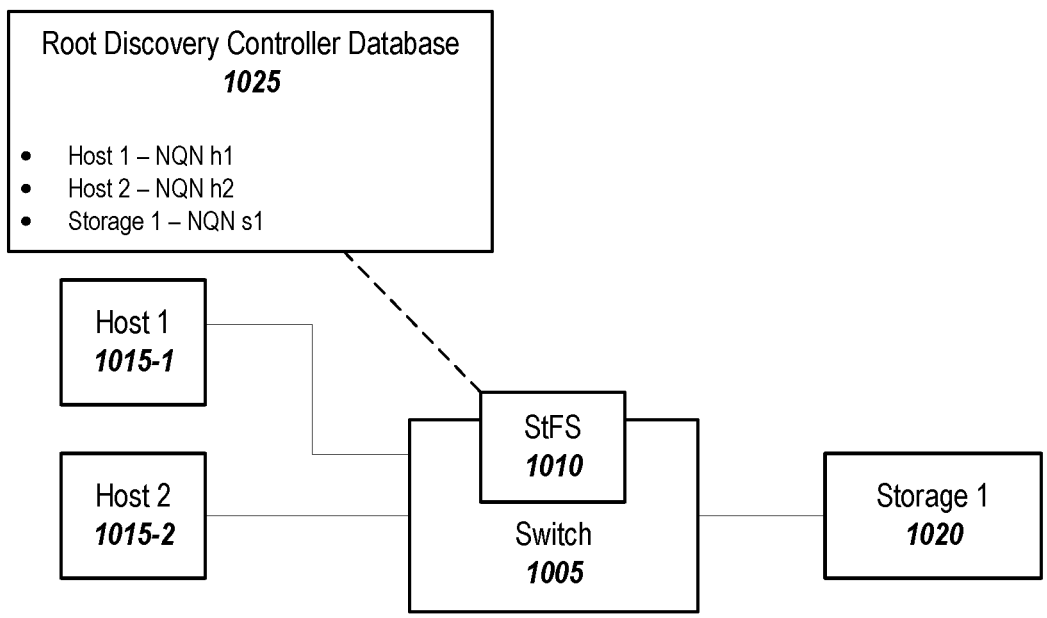
FIGS. 10A&B depict an NVMe-oF™ network that includes Storage Fabric service (StFS) functionality that supports registration and access control, according to embodiments of the present disclosure.

FIGS. 10A&B depicts an NVMe-oF™ system that includes Storage Fabric service (StFS) functionality that supports registration and zoning, according to embodiments of the present disclosure. Depicted in FIG. 10A is a switch 1005 that includes an StFS services component 1010 that support registration and zoning, according to embodiments of the present embodiment. For sake of illustration, assume that each of the NVMe™ entities (i.e., Storage 1 1020, Host 1 1015-1, and Host 2 1015-2) have already registered with the StFS service 1010 using one or more of the registration methods described above in Section B. As part of the registration, the StFS service 1010 has created a root discovery controller data store 1025 (or added to an existing data store) the registered entries for each registered NVMe™ entity element. In the depicted embodiment, the data store 1025 includes an NQN, IP address, or both for each registered NVMe™ entity element.

Figure 11:
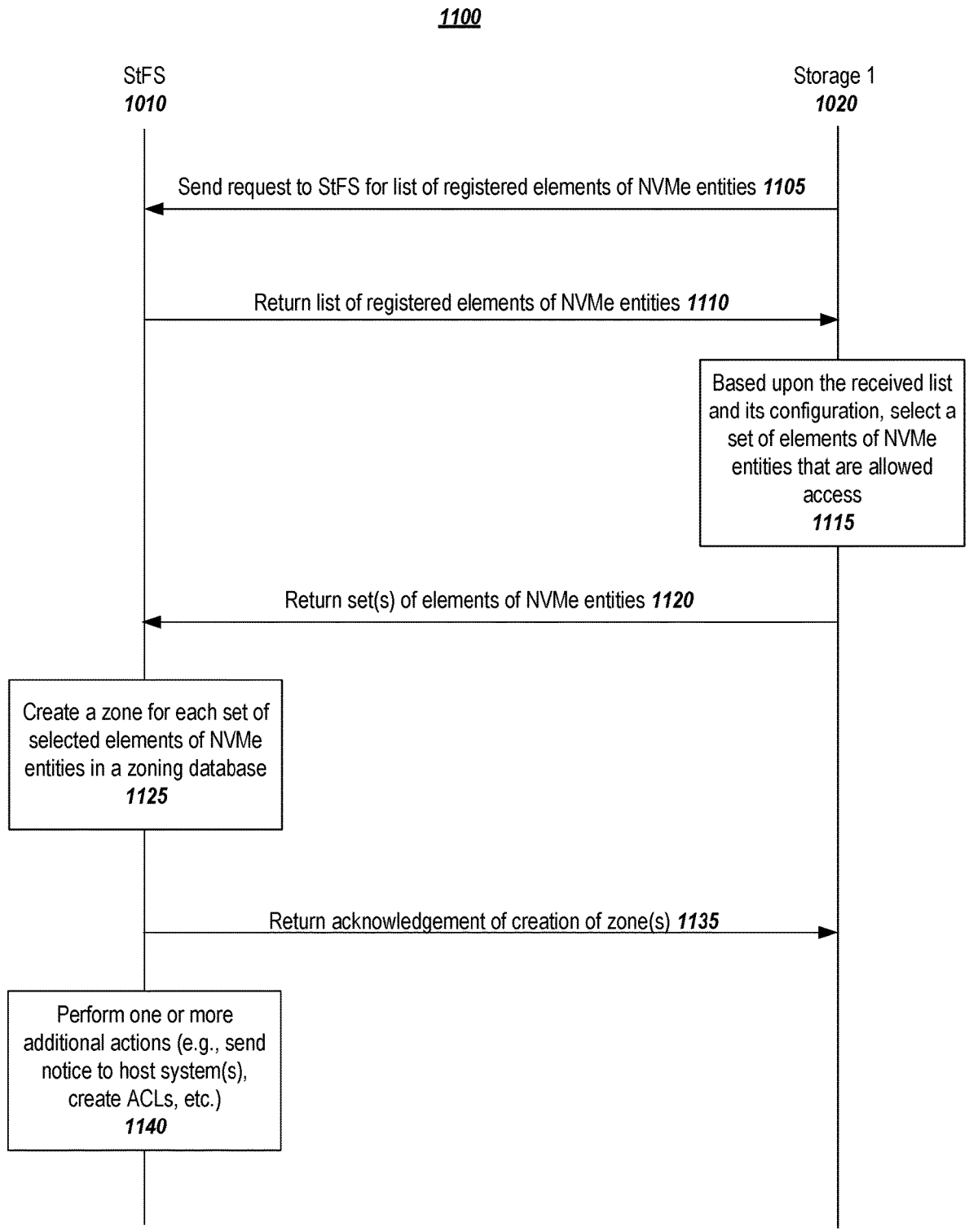
FIG. 11 depicts a method for an NVMe™ entity to obtain from the StFS as part of the access control process information about elements of NVMe™ entities that have registered with the StFS, according to embodiments of the present disclosure.

FIG. 11 depicts a method for an NVMe™ element (e.g., an NVM subsystem) to obtain from the StFS as part of the zoning process, information about elements of NVMe™ entities registered with the StFS, according to embodiments of the present disclosure. An NVM subsystem (e.g., Storage 1 1020) may send (1105) a request to the centralized storage fabric service (e.g., StFS 1010) for a list of registered elements of NVMe™ entities. In one or more embodiments, the request includes an indication that a full Discovery Log Page is being requested. In one or more embodiments, the request may be a "Get Log Page" Admin command. The StFS component 1010 receives the requests and obtains a list of registered elements of NVMe™ entities for the data store 1025 and returns (1110) the list to the requester, which in this example is Storage 1.

Based upon the received list and the configuration settings of the NVM subsystem, it selects or identifies a set of elements of NVMe entities from the received list to which access can be granted. In one or more embodiments, the configuration settings of the NVM subsystem includes information identifying which hosts are allowed access to its storage. It shall also be noted that the NVM subsystem may also configure or identify: (1) hosts for more than one storage element for which it is responsible; (2) other storage elements (e.g., to set up data replication); or (3) both.

Having selected the set or sets of appropriate elements of NVMe™ entities, the NVM subsystem returns (1120) the list or lists to the StFS 1010. In one or more embodiments, the response may include a number of allowed elements, which specifies the number of elements of NVMe™ entities that the NVM subsystem are indicating as being allowed access to a storage element or elements. In one or more embodiments, the StFS is provided an allowed NVMe™ entry for each such element. The allowed NVMe™ entry may include an entry type, an NVMe™ qualified name (NQN) for identifying the NVMe™ element, a transport address for specifying an address for the NVMe™ element, and a host identifier if the NVMe™ element is a host. In one or more embodiments, return a list (e.g., an allowed entity registration message) for each interface/element that is allowing access to the listed elements.

In one or more embodiments, the allowed entity registration process may parallel aspects of the registration process discussed above. For example, an Allowed NVMe™ Entity Registration (ANER) message having a same or similar structure as depicted in FIG. 5 may be communicated to the StFS, in which the ANER indicates a number of elements that will be allowed. In one or more embodiments, data about each allowed is provided in an allowed entity entry. Depending upon the underlying protocol, the StFS may request the specified number of allowed NVMe™ entries or may receive them automatically. In one or more embodiments, the request or command may be of the form of an Admin command, such as described in the NVM Express™ Base Specification Rev. 1.4 (which is incorporated herein by reference in its entirety), which is produced by the NVM Express™ organization-a non-profit consortium of technology industry leaders. It shall be noted that other types and formats of command may be employed.

In one or more embodiments, the data for each allowed entity entry (AEE) may be of a format that is the same as or similar to the format depicted in FIG. 6. An allowed entity entry may include one or more data blocks, in which each data block corresponds to one of the allowed entities and there are the same number of entries as set forth in the AER message.

In one or more embodiments, an allowed entity entry may be the same as or similar to that depicted in FIG. 7. It shall be noted that the depicted entry embodiment is only one example and that different configurations/layout, different fields (or parameters), and different data field sizes may be used. It shall also be noted that NVMe™ hosts and NVM subsystem may use the same or different formats. In one or more embodiments, the allowed entity entry (AEE) may include such parameters as:

(1) Transport Type (TRTYPE), which specifies the NVMe™ transport type;
(2) Subsystem Type (SUBTYPE);
(3) Transport Address (TRADDR), which indicates: (a) for NVM subsystems, the address of the NVM subsystem port that may be used for a connect command, and (b) for NVMe™ hosts, the address of the host interface that will be used to connect to NVM subsystem or to a controller on the NVM subsystem;
(4) Transport Specific Address Subtype (TSAS), which specifies additional information about the transport address of item (3) (above);
(5) If an NVMe™ hosts, an NVMe™ Qualified Name (NQN) that uniquely identifies the host system;
(6) If an NVM Subsystem, an NVM Subsystem Qualified Name (SUBNQN), which indicates the NVMe™ Qualified Name (NQN) that uniquely identifies the NVM subsystem; and
(7) If a Host, a Host Identifier (HOSTID), which is used for NVMe™ hosts and may have the same definition as the Host Identifier defined in the "Host Identifier" section of the NVMe™ Base specification, which is incorporated by reference herein.

Returning to FIG. 11, In one or more embodiments, the StFS receives the list or lists (i.e., the allowed entity entry or entries (AEE)) and creates (1125) a zone for each set of selected elements of NVMe™ entities in a zoning data store. Assume, for purposes of illustration, that Storage 1 1020 is configured to allow access to Host 1 1015-1 and Host 2 1015-2 and therefore returns a set comprising identifiers indicating that Storage 1, Host 1, and Host 2 are to be formed into a zone. In one or more embodiments, the identifier may be the NQN for the NVMe™ entity and, may also include its IP address, although a different identifier or identifiers may additional or alternatively be used.

Figure 10B:
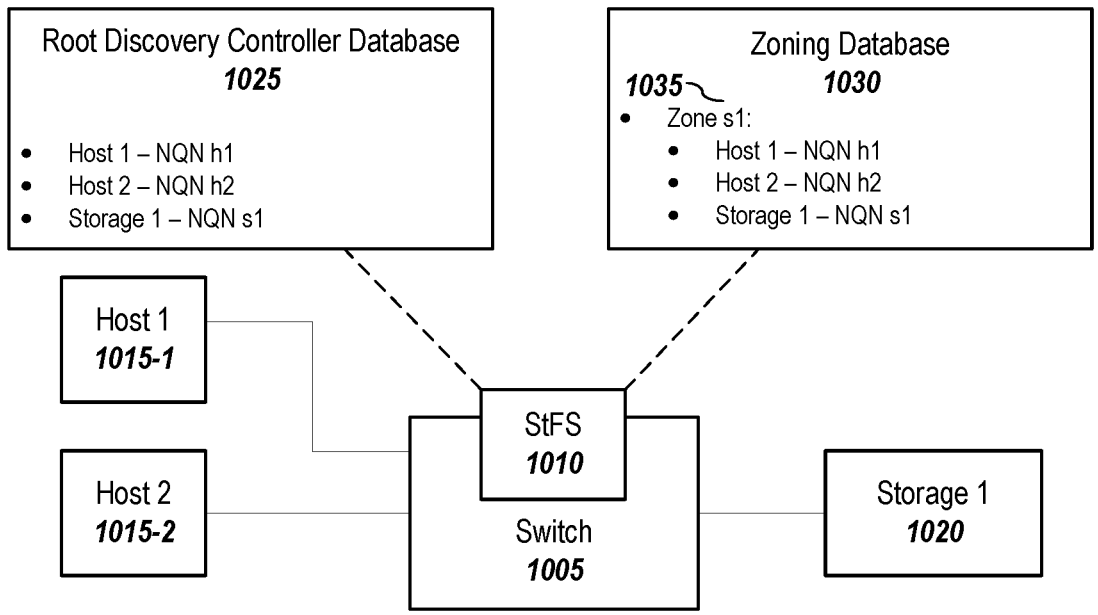
FIGS. 10C&D depict an alternative NVMe-oF™ network that includes Storage Fabric service (StFS) functionality that supports registration and access control (e.g., zoning), according to embodiments of the present disclosure.
FIG. 10D graphically illustrates that the StFS has added an entry in the zone data store, in which Host 1, Host 2, Host 3, and Storage 1 are members of the same zone.

FIG. 10B graphically illustrates that the StFS 1010 has created a zone entry 1035 in a zone data store 1030, in which Host 1, Host 2, and Storage 1 are identified as being members of that zone 1035. In one or more embodiments, the identifier for the various NVMe™ entities elements in the zone data store are the NQN for the NVMe™ entity element and may also include its IP address, although a different identifier or identifiers may additional or alternatively be used. In one or more embodiments, the StFS returns (1130) an acknowledgement that a zone corresponding to the set of selected elements has been created.

In one or more embodiments, the StFS may perform (1135) one or more additional actions, such as sending one or more notices (such as an asynchronous event notification (AEN)), to the appropriate NVMe™ host systems, create or update one or more Access Control Lists (ACLs), and the like.

Figure 12:
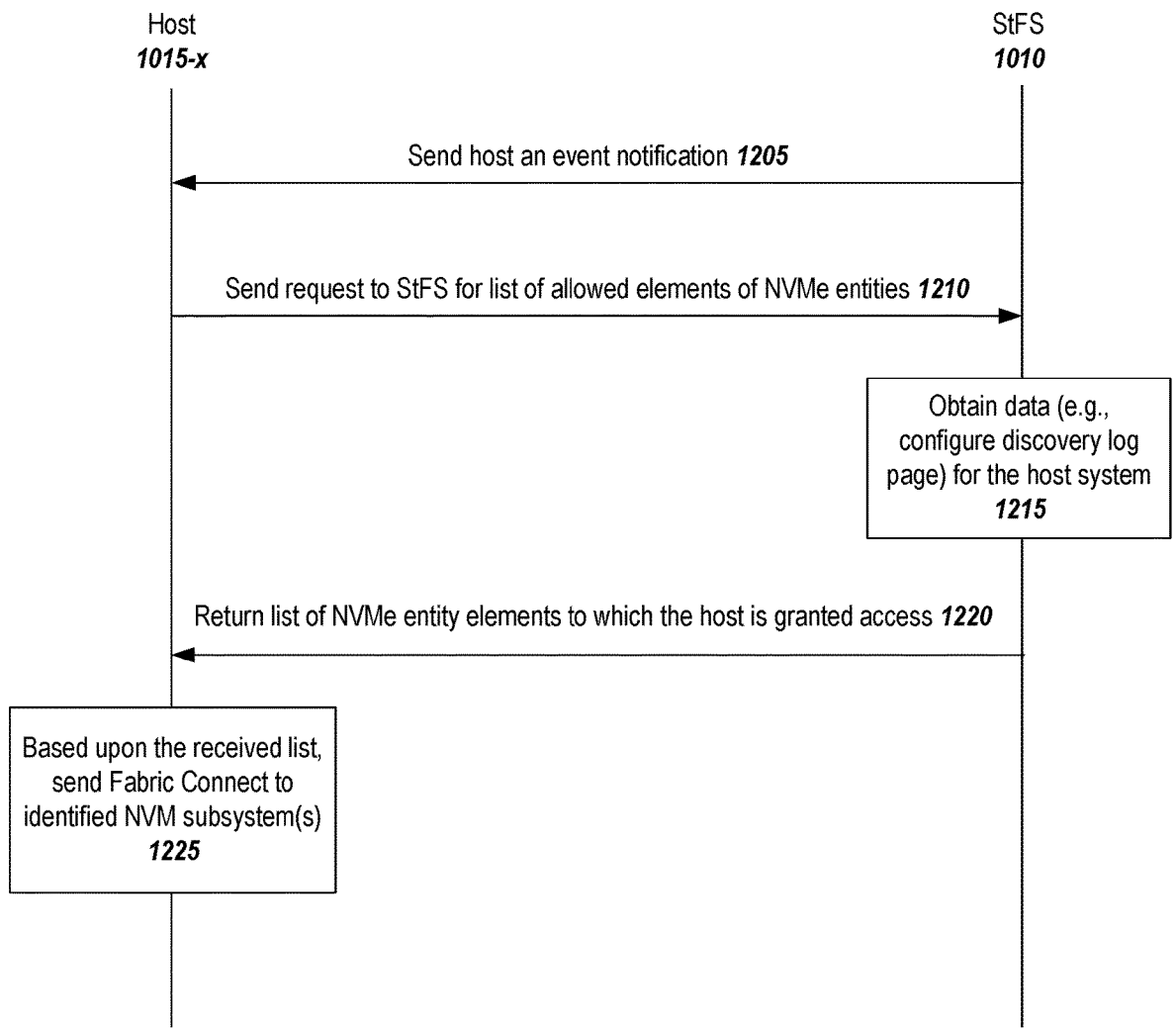
FIG. 12 depicts a method for an NVMe™ entity (e.g., an NVMe™ host) to obtain from the StFS as part of an access control process information about elements of NVMe™ entities to which the NVMe entity has been granted access, according to embodiments of the present disclosure.

FIG. 12 depicts a method for an NVMe™ entity (e.g., an NVMe™ host) to obtain from the StFS as part of the zoning process information about elements of NVMe™ entities to which the NVMe™ entity has been granted access, according to embodiments of the present disclosure. In one or more embodiments, the NVMe™ entity (e.g., a host 1015-x) may receive (1205) from the centralized storage fabric service (e.g., StFS 1010) a notification. In one or more embodiments, the notification is an asynchronous event notification (AEN), which may have been prompted to be sent as a result of a zone creation in which the host is a member. For example, the creation of zone s1 1035 in the zoning data store 1030 as graphically depicted in FIG. 10B as part of the method of FIG. 11 may result in the StFS 1010 notifying (1205) Host 1 1015-1, Host 2 1015-2, or both.

Responsive to receiving the notification, the NVMe™ entity (e.g., host 1015-x) sends (1210) a request to StFS for a list of elements of NVMe™ entities (e.g., storage elements of an NVM subsystem) to which the host has been granted access. In one or more embodiments, the request may be a Get Log Page command as defined by NVMe-oF™. It shall be noted that the host may send the request upon other triggers and at other times, such as at regular intervals, upon initial configuration, upon power on, etc. In one or more embodiments, the StFS receives the request and obtains (1215) the appropriate data for the host, which may be obtained by querying the zoning data store. For example, in one or more embodiments, the StFS may configure (1215) a discovery log page for the host system that contains the relevant information. In one or more embodiments, the discovery log page may comprise zero or more discovery log entries and each entry may comprise transport layer information (e.g., an IP Address) for each subsystem interface that this host is allowed to access.

It shall be noted that obtaining or configuring the information may be done in response to the request or may be done in advance. Having collected the appropriate information for the host, the StFS returns (1220) the list of NVMe™ entity elements to which that host has been granted access.

In one or more embodiments, given the received list of one or more NVMe™ entity elements, the host connects to these NVMe™ entity elements. For example, in one or more embodiments, the host may send to a Fabric Connect message to each storage element identified in the received list. For example, in one or more embodiments, as illustrated in FIG. 9, a host may perform steps 916 through 934 and then steps 944 through 950.

Figure 10C:
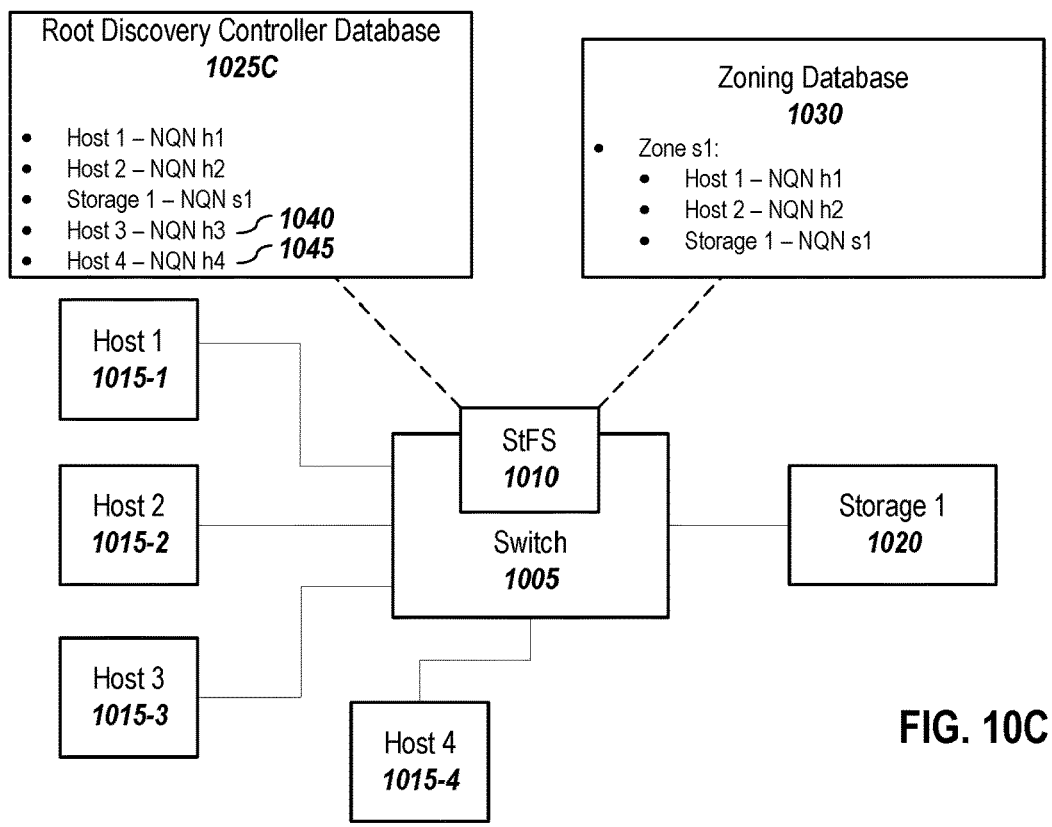

FIGS. 10C&D and 13 represent an embodiment of facilitating access control through zoning in which one or more new hosts have been added to the overall system. FIG. 10C illustrates that two new hosts, Host 3 1015-3 and Host 4 1015-4, have been added to the overall network system. As part of their additions to the system, the new hosts have registered via the centralized root discovery controller with the StFS 1010, so that they have registration entries (e.g., registration entries 1040 and 1045) in the root discovery controller data store 1025C.

Figure 13:
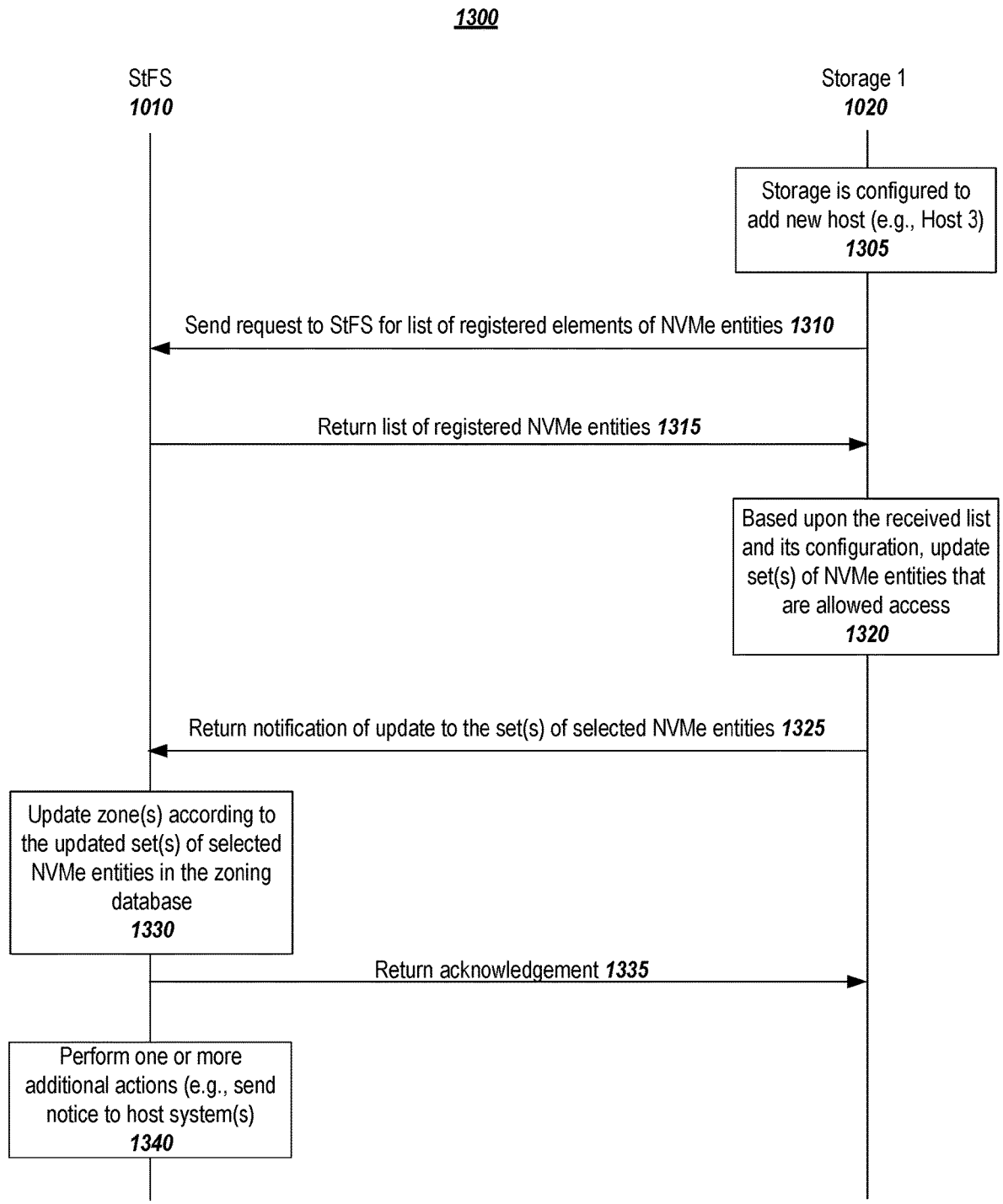
FIG. 13 depicts a method for facilitating access control in NVMe™ system after a change has occurred in the system, according to embodiments of the present disclosure.

Turning now to FIG. 13, FIG. 13 depicts a method for an NVMe™ element (e.g., an NVM subsystem) to participate in updating access control, according to embodiments of the present disclosure. Assume for purposes of illustration that one of the new hosts-Host 3 1015-3—is to be granted access to Storage 1 1020. In one or more embodiments, Storage 1 is configured (1305) to accept a new host or host (e.g., Host 3) in its list of approved hosts. In one or more embodiments, the change to its configuration prompts the NVM storage subsystem (i.e., Storage 1) to send (1310) a request to the centralized storage fabric service for a list of registered elements of NVMe™ entities, which may be a request for a full discovery log page in like manner as described in various embodiments with reference to FIG. 11 (above). It shall be noted that the NVM subsystem may send the request to the StFS upon other triggers and at other times, such as at regular intervals, upon initial configuration, upon power on, etc. In one or more embodiments, the request may be a "Get Log Page" Admin command. The StFS component 1010 receives the requests and obtains a list of registered elements of NVMe™ entities for the data store 1025 and returns (1110) the list to the requester (i.e., Storage 1). Note that, in the depicted embodiment, the list now includes the newly registered Host 3 1015-3 and Host 4 1015-4.

Based upon the received list and the NVM subsystem's configuration settings which includes an indication that Host 3 is an allowed host, it selects or identifies a set of elements of NVMe™ entities from the received list to which access can be granted; in this example, it is Hosts 1-3 but not Host 4. Having selected the set of appropriate NVMe™ entities, the NVM subsystem returns (1325) a notification of updated selected NVMe™ entities to the StFS. In similar manner as explained with respect to FIG. 11, the notification may be an Allowed NVME Entity Registration (ANER), which contains or will correspond to the communication of the selected allowed entity entry (AEE) or entries. In one or more embodiments, a full replacement list of the selected NVMe™ entities (e.g., Host 1, Host 2, and Host 3) may be communicated (e.g., an AEE entry for each selected NVMe™ entity) or may be merge list that includes the changes (i.e., add Host 3 to Zone s1).

Figure 10D:
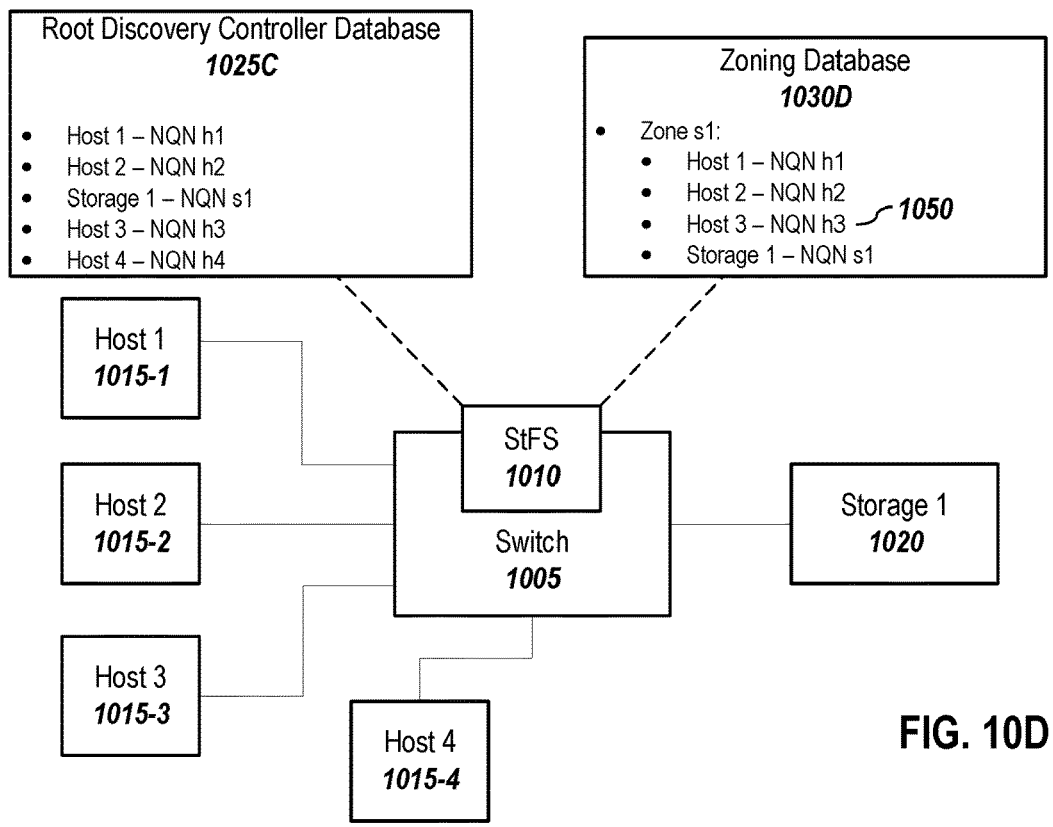

In one or more embodiments, the StFS receives the list and updates (1330) the zoning data store. As illustrated in FIG. 10D, the StFS has added Host 3 as a member 1050 to the appropriate zone in the zone data store 1030D; thus, the data store 1030D now includes identifiers indicating that Storage 1, Host 1, Host 2, and Host 3 are members of zone s1. In one or more embodiments, the identifier may include, for each NVMe™ entity, its NQN, its IP address, or both—although a different identifier or identifiers may additional or alternatively be used.

In like manner as discussed above with respect to FIG. 11, the StFS may return (1335) an acknowledgement that the zoning data store has been updated corresponding to the set of selected elements, and the StFS may perform (1340) one or more additional actions, such as sending one or more notices to the appropriate NVMe™ host systems, create Access Control Lists (ACLs), etc.

It shall be noted that the NVMe™ entities may include an agent that interacts with the centralized fabric storage services to effect zoning as illustrated by embodiments in this section. It shall also be noted that the zoning functionality may be incorporated into a single agent that facilitates registration functionality as discussed in the prior section.

D. Implicit Discovery Controller Registration Embodiments

Section B, above, presented embodiments that facilitated explicit or direct registration with a centralized storage fabric service. As discussed in detail above, embodiments of explicit registration involve sending information to the StFS controller about an NVMe™ host or an NVM subsystem, which facilities registration in a centralized registration datastore and provides information that may be used for other purposes, including discovery and zoning, embodiments of which are also discussed in Section C, above.

In addition to, or as an alternative to, explicit registration of NVMe™ entities, it may be beneficial to allow for the automatic implicit registration of NVMe™ entities. In one or more embodiments, explicit registration works well for NVMe™ entities that include support for interfacing with an StFS controller. For example, in one or more embodiments, an NVMe™ entity includes an StFS client that is able to send registration commands and use target driven zoning commands. However, there may be some devices that are not configured to support such services or are not capable of running an StFS client. For example, an Ethernet bunch of flash (EBOF) device (e.g., NVMe™ SSDs in a disk array enclosure) that may have a management interface and at least one data plane connection but may not be capable of running a full StFS client. Or, a device may have limited management interface (e.g., a command line interface (CLI) or graphical user interface (GUI)) that does not allow for configuring it explicitly so that it can register itself directly with the StFS controller. Thus, such situations create a problem if only explicit discovery were supported-if an NVMe™ entity comes online, the system may be unable to discover such devices because they have not registered any information. Thus, in one or more embodiments, supporting automatic implicit registration of such devices allows from them to be discovered, which facilitates other services such as zoning.

In one or more embodiments, implicit registration is enabled by having the StFS controller take an active role in registering other devices. Instead of waiting for registration commands to arrive from attached NVMe™ entities, the StFS controller may use the presence of certain traffic, such as a Link Layer Discovery Protocol (LLDP) exchange or a Multicast Domain Name System (mDNS) request, to implicitly detect and register NVMe™ entities. In one or more embodiments, the StFS may monitor for such traffic at various events, such as initial connection of the device, or according to a schedule. In one or more embodiments, the message from an NVMe™ entity includes an indicator that it is NVMe™ capable. For example, in one or more embodiments, a TLV (type-length-value) field or fields may be defined for a protocol such as LLDP that allow the StFS controller to recognize that an NVMe™ entity, such as an EBOF, is coming online and should be implicitly registered. Or, for example, via one or more mDNS requests, the StFS may see a notification that indicate that the sending device has a subordinate discovery controller or is an NVMe™ entity that lacks a discovery controller. In these cases, the StFS may be configured to perform implicit registration on behalf of such devices.

In one or more embodiments, the StFS controller may act as a host and send a command, such as a Fabrics connect command, to the NVM storage end device as if it were a host. As a result, the StFS would receive information (e.g., via NVMe™ Get Log Page commands) from the NVMe™ end device about interfaces associated with the that device, which the StFS can use to create an implicit registration or registrations in a centralized registration data store (e.g., a root discovery controller database). As a result of this process, the NVMe™ device is implicitly registered and discoverable—the device can be discovered, which facilitates other processes, such as provisioning and zoning.

Figure 14:
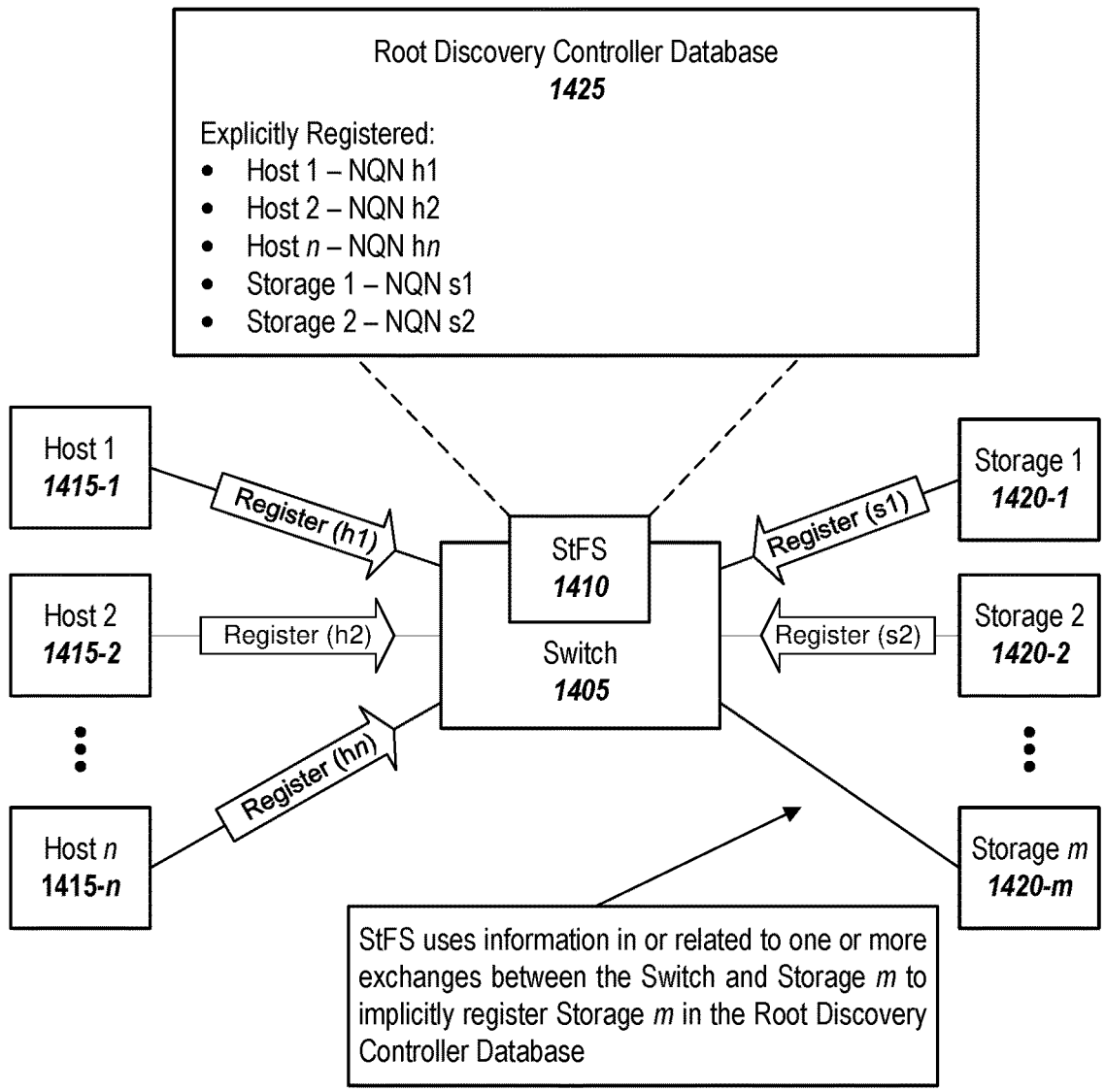
FIG. 14 depicts an NVMe-oF™ network that includes Storage Fabric service (StFS) functionality, according to embodiments of the present disclosure.
Figure 15:
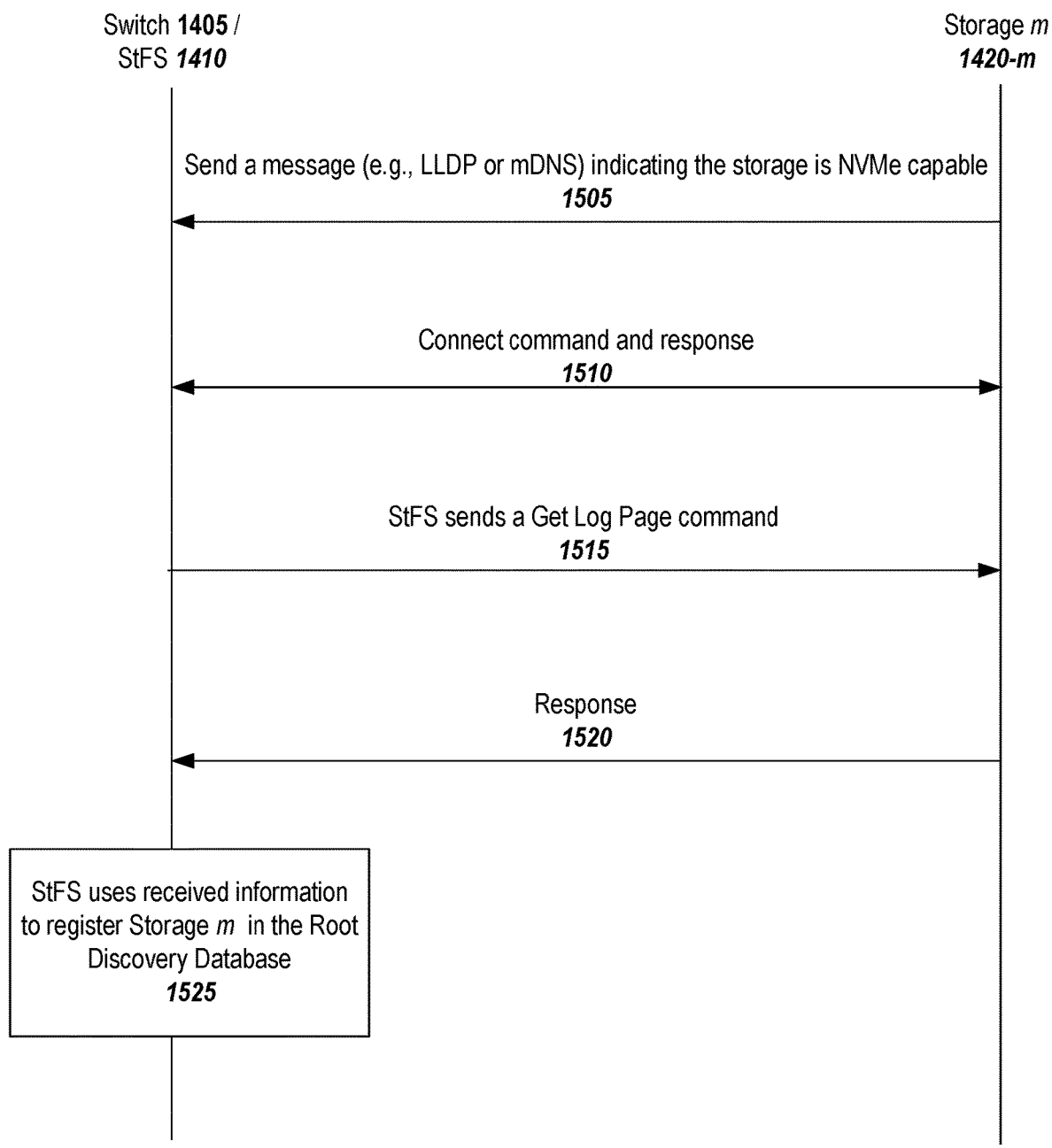
FIG. 15 depicts a method for implicit registration, according to embodiments of the present disclosure.

Consider, by way of illustration, the example system depicted in FIG. 14. Shown in FIG. 14 is an NVMe-oF™ network 1400 that includes Storage Fabric service (StFS) functionality 1410 that supports storage fabric services, such as registration and access control, according to embodiments of the present disclosure. As illustrated in FIG. 14, Host 1 1415-1 through Host n 1415-n, Storage 1 1420-1, and Storage 2 1420-2 have all explicitly registered with the StFS 1410 and are included in the centralized registration datastore (i.e., root discovery controller database 1425). Assume, for sake of illustration, that Storage m 1420-m is an EBOF device that was just added to the network 1400. FIG. 15 depicts a method for implicit registration of Storage m, according to embodiments of the present disclosure.

As depicted in FIG. 15, the storage system, Storage m 1420-m, transmits (1505) a message (e.g., an LLDP message or a multicast DNS request) to the switch 1405 that indicates that the device 1420-m is NVMe™ capable. Upon receiving the communication from Storage m, the switch 1405 forwards this request to the centralized storage fabric services (e.g., StFS 1410). In one or more embodiments, the StFS controller 1410 sends (1510) a command (e.g., a Connect command) to Storage m 1420-m, and Storage m responds (1510). In one or more embodiments, if the Connect command and response successfully completes, the StFS transmits (1515) a request for information (e.g., a Get Log Page command) to Storage m 1420-m, which will return (1520) information to the StFS 1410. In one or more embodiments, the StFS 1410 uses at least some of the information from the Connect command and the fabric connection to implicitly register Storage m in a centralized registration datastore (e.g., root discovery controller database 1425). In one or more embodiments, the information may comprise an indication the type of NVMe™ entity (e.g., NVM subsystem), transport address information and transport service information that specify a communication endpoint for an element of the NVMe™ entity, and a NVMe™ Qualified Name (NQN). In one or more embodiments, a communication endpoint information represents information used for communicating with a fabric port and may include such information as IP address, protocol identifier (e.g., TCP or UDP), and port number.

Figure 16:
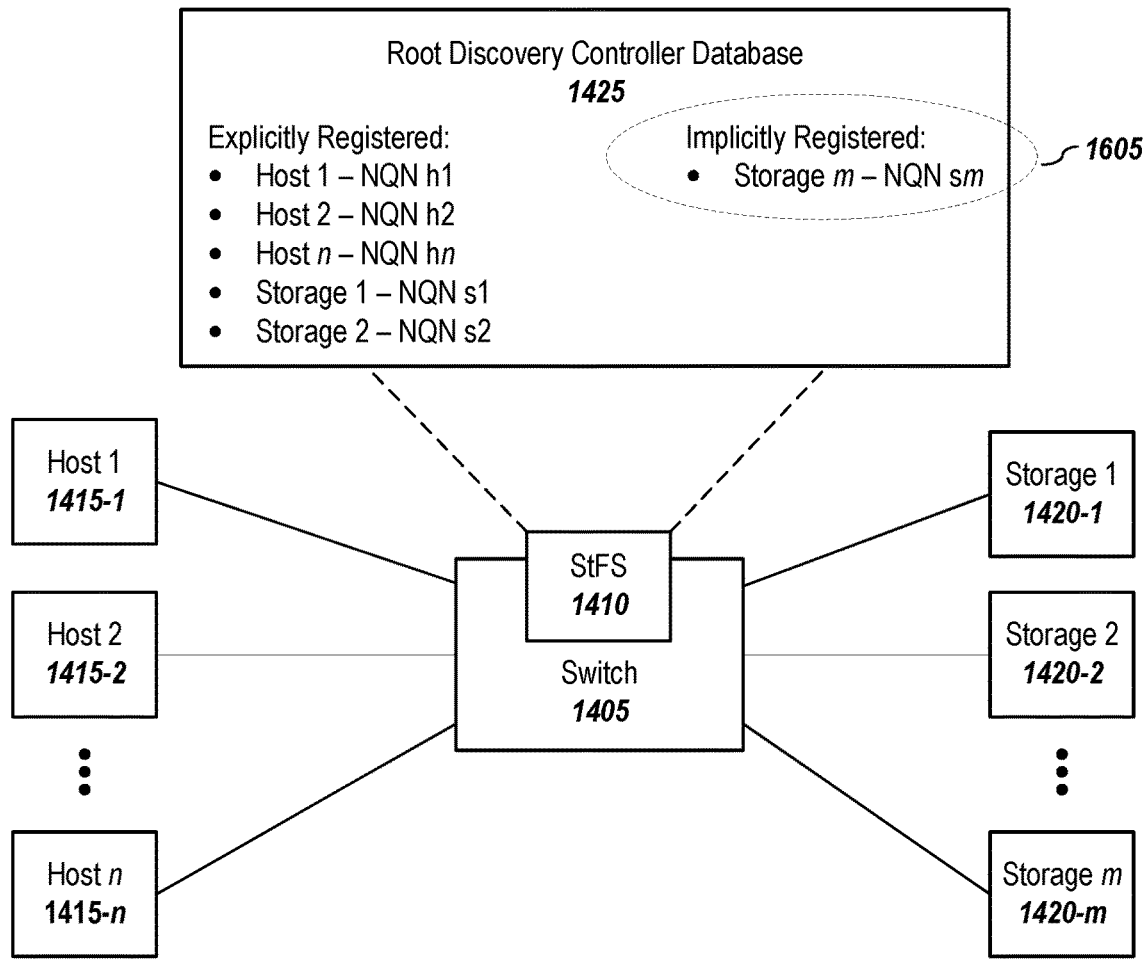
FIG. 16 illustrates the system of FIG. 14 in which an NVMe™ entity has been implicitly registered, according to embodiments of the present disclosure.

FIG. 16 illustrates the system 1400 of FIG. 14, however, the root discovery controller database 1425 now includes an entry 1605 for Storage m, which has been entered on its behalf by the StFS controller 1410. Because Storage m is now registered, its information is available for other elements in the NVMe-oF™ system 1400 to discover, which facilitates other network services, such as provisioning and zoning.

Figure 17:
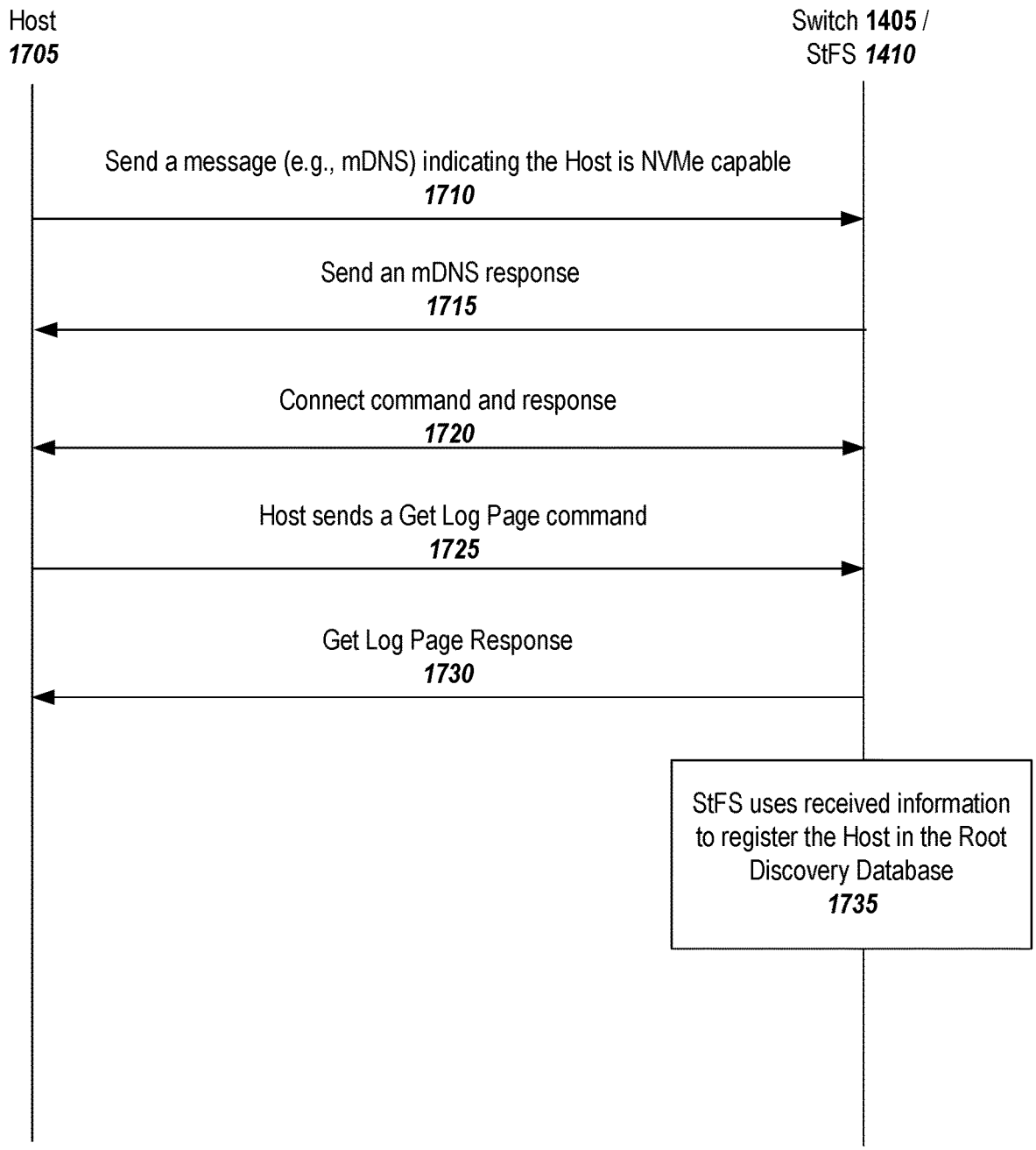
FIG. 17 depicts a method for implicit registration of an NVMe™ host, according to embodiments of the present disclosure.

In one or more embodiment, the StFS may implicitly register an NVMe™ host in a similar manner as described above. FIG. 17 depicts a method for implicit registration of a host, according to embodiments of the present disclosure. As depicted in FIG. 17, the host, Host 1705, transmits (1710) a message (e.g., an mDNS request) to the switch 1405 that indicates that the device 1420-m is NVMe™ capable. In one or more embodiments, the StFS controller 1410 sends (1715) a response, and the switch/StFS and the host interact (1720) via a command and response (e.g., a Connect command and response). As illustrated in the embodiment of FIG. 17, the host transmits (1725) a request for information (e.g., a Get Log Page command) to the StFS, which returns (1730) information to the host 1705. In one or more embodiments, the StFS 1410 uses at least some of the information extracted from the received data and the fabric connection to implicitly register the host 1705 in a centralized registration datastore (e.g., root discovery controller database 1425). In one or more embodiments, information from the Get Log Page interchange may not be used in implicit registration; thus, in one or more embodiments, the StFS may perform implicit registration sooner (e.g., after step 1720). In one or more embodiments, the extracted information may comprise an indication the type of NVMe™ entity (e.g., host), a transport address for specifying a communication endpoint for an element of the NVMe™ entity, and a NVMe™ Qualified Name (NQN). In one or more embodiments, a determination that the end device is a host may be made by: (1) a host neither responding to nor advertising an NVMe-discovery service via mDNS; (2) a host not describing itself as an NVM subsystem via LLDP; and/or (3) a host sending a Connect command to the discovery controller.

In one or more embodiments, the system may be configured to support both implicit and explicit registration processes. For example, the system may be configured so that when a device initially connects to the network, it undergoes an implicit registration process, such as one described above. Subsequently, the device may explicitly register, which may include additional information, such as symbolic name, which would not have been extracted or may not have been available as part of the implicit registration process. In one or more embodiments, since the StFS already knows and has registered some information about the NVMe™ entity, the StFS may request just a subset of information; thereby reducing the amount of information that is communicated. Alternatively, the StFS may request all of the information that is contained in a full discovery controller registration command as discussed above in Section B to ensure that the StFS has correctly and completely captured information for the implicit registration, to keep the explicit registration process consistent, or for other reasons.

Given implicit registration, one or more additional procedures may be implemented. To avoid duplicating efforts, an NVMe™ entity may signal to the StFS controller that it will be explicitly registering, and therefore, the StFS controller can forego implicitly registering that NVMe™ entity. For example, an indicator, such as a TLV field, may be specified and used in the LLDP protocol by the NVMe™ entity to indicate to the StFS controller during an initial connection that the NVMe™ entity will subsequently explicitly register so the StFS controller can skip implicitly registering the NVMe™ entity. Other efficiencies may also be implemented. Consider, by way of illustration, the following example. Assume an NVMe™ entity, which has an StFS client, connects to an NVMe-oF™ network. In one or more embodiments, the StFS client is configured to know that as part of the LLDP exchange, the NVMe™ entity will be implicitly registered by the StFS controller. For efficiency, the StFS client may withhold responding to mDNS requests because it knows that the StFS client has registered it with the StFS central registration datastore; thus, it need not ever respond to mDNS requests.

It should be noted that implicit registration is also beneficial in several NVMe™ host situations. Consider situations in which the NVMe™ host functionality is limited.

One example may be that a host, with a standard NVMe™ driver, performs mDNS and discovers the StFS controller (e.g., StFS 1405). However, the host does not have a full StFS client but rather just discovery functionality, which it can use to discover whether the network has or does not have an StFS central controller. When the host connects to the StFS discovery controller to determine with whom it can communicate, the StFS controller can register the host's information that it extracted from a Connect command that was sent to the discovery controller and store it in the root discovery controller database so it is available. Thus, regardless whether the host is manually configured with the IP Address of the root discovery controller or that IP Address is discovered via mDNS, when the host connects to the StFS, the StFS controller can create a record for that host by extracting data from the Connect command and the fabric connection used to transmit that command to the StFS. The extracted data may include information such as IP address, TCP port, entity type, host name, NQN, etc. Thus, embodiments may comprise extracting information from the Connect command and associated fabric connection for the host or subsystem, and other embodiments may comprise getting information from the host or subsystem and using that information to augment the registration. In one or more embodiments, if the host subsequently performs explicit registration, the registration will be augmented with any additional information that is provided, such as a symbolic name.

E. Symbolic Name Embodiments

One theme of embodiments of the present disclosure is to reduce discovery and configuration issues in NVMe-oF™ environment. One aspect that can help make finding elements of NVMe™ entities and/or forming groups is naming. Embodiments herein may define and use a new parameter—symbolic name—that may be added to NVMe-oF™ environments and that may be used to facilitate connectivity between groups of one or more NVMe-oF™ hosts and one or more NVM subsystems that have been configured to provide namespaces to them.

In one or more embodiments, symbolic name allows for the identification of a host or group of hosts (e.g., clusters that make use of shared storage) via a symbolic name or names. Furthermore, in one or more embodiments, NVMe™ entities may perform actions, such as zoning and namespace masking, using symbolic name.

Another benefit of using symbolic name is that it allows for easier replacement of an NVMe™ entity. For example, if a host fails and is replaced, if its replacement is assigned the same symbolic name, it can readily resume privileges and connectivity of its predecessor device without having to re-perform masking and/or zoning.

As noted above, a symbolic name may be shared by different NVMe™ entities. Also, in one or more embodiments, an NVMe™ entity may have more than one symbolic name.

Figure 18:
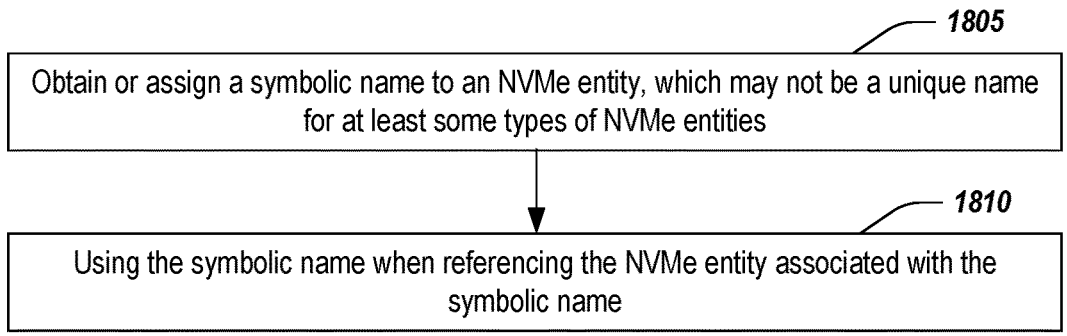
FIG. 18 depicts a methodology for employing symbolic names in an NVMe-oF™ environment, according to embodiments of the present disclosure.

FIG. 18 depicts a methodology for employing symbolic names in an NVMe-oF™ environment, according to embodiments of the present disclosure. To be used, a symbolic name is obtained or assigned (1805) to an NVMe™ entity. In one or more embodiments, the symbolic name may not be a unique name for at least some types of NVMe™ entities. For example, two or more NVMe™ hosts may be assigned or use the same symbolic name. A benefit of such is that it creates an efficient way for identifying a group of hosts, which may be granted access to a common NVM subsystem via zoning.

As noted above, symbolic name may be included in the information provided as part of the explicit registration. In one or more embodiments, the symbolic name of an NVMe™ host or NVM subsystem may be included in a SYM field. In one or more embodiments, an associated Address Family field may be used to describe the reference for parsing this field.

In one or more embodiments, the symbolic name may be included in the information provided as part of the implicit registration by, for example, defining a new field or TLV value. In yet additional embodiments, a symbolic name may be assigned to an implicitly registered element by an administrator or programmatically by the StFS controller. In such cases, if the implicitly registered element later explicitly registers and supplies a different symbolic name, the StFS controller may have its registration entry and zoning entries updated with that symbolic name.

In any event, the symbolic name may be used (1810) when referencing the NVMe™ entity associated with the symbolic name, such as with target driven zoning. Consider, by way of illustration, the example depicted in FIG. 19.

Figure 19:
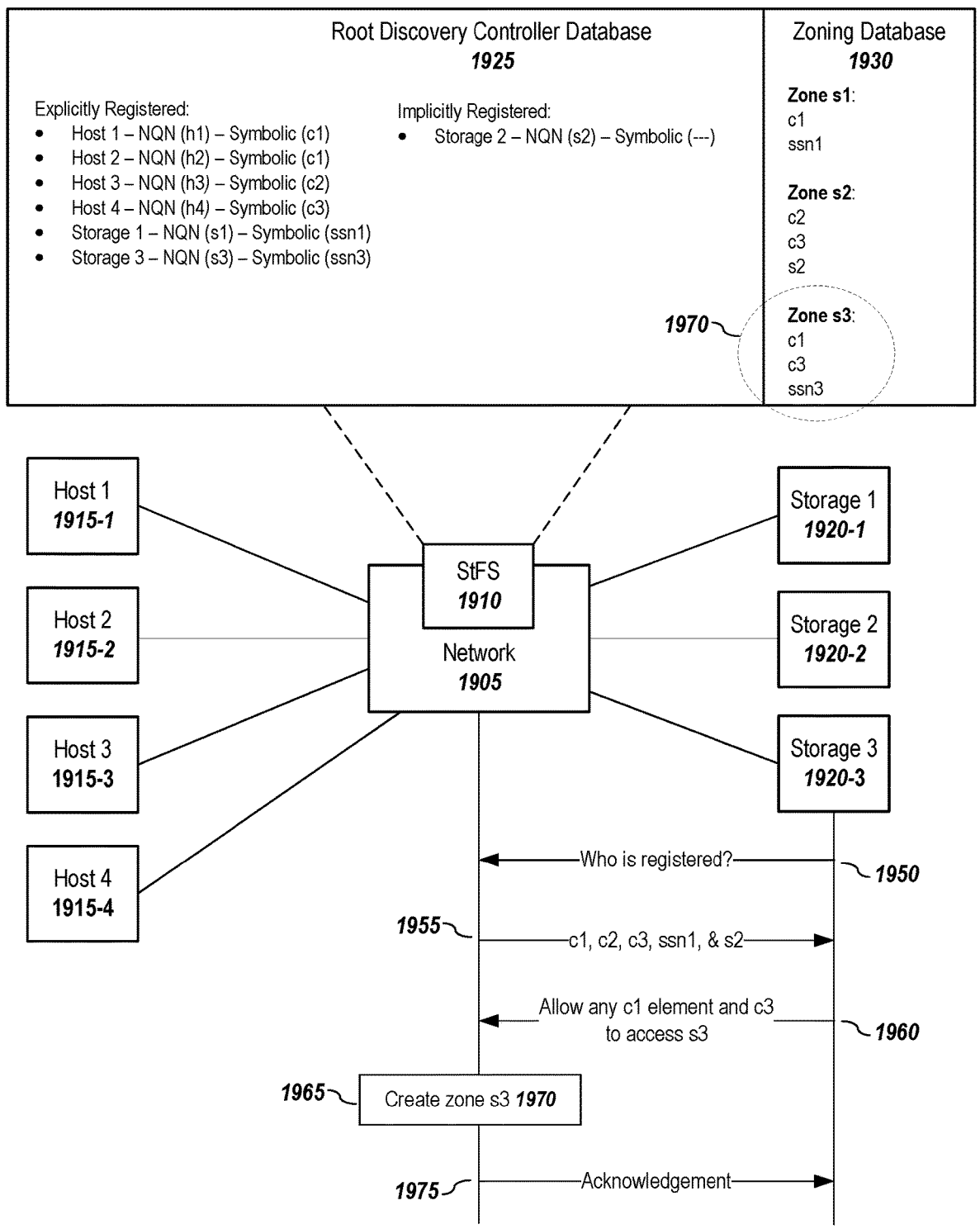
FIG. 19 depicts an NVMe-oF™ network that includes Storage Fabric service (StFS) functionality and symbolic names, according to embodiments of the present disclosure.

FIG. 19 depicts an NVMe-oF™ network that includes Storage Fabric service (StFS) functionality and symbolic names, according to embodiments of the present disclosure. Shown in FIG. 19 is an NVMe-oF™ network 1900 that includes Storage Fabric service (StFS) functionality 1910 that supports storage fabric services, such as registration and access control, according to embodiments of the present disclosure. As illustrated in FIG. 19, a number of devices are connected via a network of one or more devices 1905.

Note that Host 1 1915-1 through Host 4 1915-4, Storage 1 1920-1, and Storage 3 1920-3 have all explicitly registered with the StFS 1910 and are included in the centralized registration datastore (i.e., root discovery controller database 1925). As part of the registration process, a symbolic name has been identified for each of the explicitly registered NVMe™ entity. Storage 2 1920-2 has been registered implicitly. In one or more embodiments, Storage 2 1920-2 has not been assigned or has not provided a symbolic name.

Also depicted in FIG. 19 is a zoning database 1930. Two zones have already been created—Zone s1, which has members Host 1, Host2, and ssn1; and Zone s2, which has Host 3, Host 4, and storage 2. Note that one of the benefits of using symbolic name is that the entry, c1, refers to multiple entities—in this example Host 1 and Host 2. Note also that since Storage 2 1920-2 does not have a symbolic name in the registration, another identifier may be used, in this case, its NQN. In one or more embodiments, a unique identifier may be provided to each zone. In the depicted example, the identifier is the NQN for the principal storage entity of the zone—although other identifiers may be used.

Also shown in FIG. 19 is a high-level exchange between Storage 3 1920-3 and the StFS 1910 in which target driven zoning is performed. The methodology shown in FIG. 19 is provided to illustrate some examples of how symbolic name may be utilized; for the methods of target driven zoning, please see Section C, above.

In the depicted example, Storage 3 1920-3 is performing an exchange with the StFS 1910 to create a zone. In one or more embodiments, Storage 3 1920-3 requests (1950) a listing of registered elements from the StFS. In response, the StFS returns (1955) a listing of explicitly and implicitly registered elements of NVMe™ entities from the centralized registration data store (i.e., root discovery controller database 1925). In one or more embodiments, the StFS may return the symbolic names, the NQN, another identifier, or some combination thereof (including returning several identifiers (e.g., symbolic name and NQN) for a single element). In the depicted example, the symbolic name is returned except for Storage 2, in which case its NQN is returned. Storage 3 selects the elements that are allowed access to its storage, in this case any c1 element (which is Host 1 and Host 2) and Host 4, and notifies (1960) the StFS accordingly.

In one or more embodiments, the StFS uses the received information to create (1965) a zone, including adding a zone entry to the zoning data store. In the depicted example, Zone s3 1970 is created and added to the zoning database 1930. In one or more embodiments, the StFS may return (1975) an acknowledgement to Storage 3 that zoning was successful. It should be noted that additional steps may performed, such as notifying Host 1, Host 2, and Host 4, which would in turn request information from the StFS to gain access to Storage 3. As noted above, any of the methods discussed in Section C may be employed. It should also that one of the benefits of embodiments herein is that the masking/zoning process for the hosts does not to change from its normal course. While use of symbolic name was illustrated in the context of masking/zoning, it should be noted that symbolic name may be used in other aspects of the NVMe-oF™ network.

F. System Embodiments

In one or more embodiments, aspects of the present patent document, such as NVMe™ hosts and/or NVM subsystem, may be directed to, may include, or may be implemented on or as one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 20:
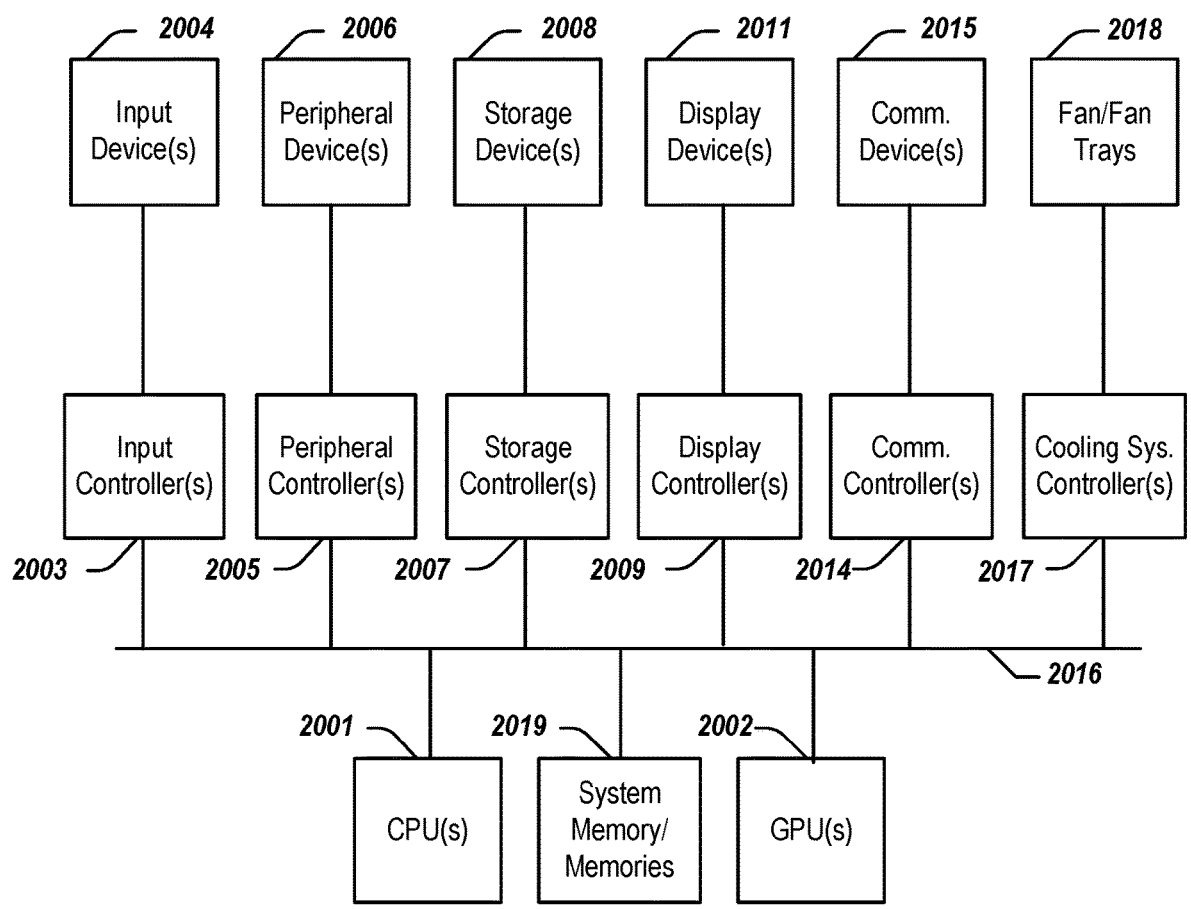
FIG. 20 depicts a simplified block diagram of an information handling system according to embodiments of the present disclosure.

FIG. 20 depicts a simplified block diagram of an information handling system (or computing system), according to embodiments of the present disclosure. It will be understood that the functionalities shown for system 2000 may operate to support various embodiments of a computing system—although it shall be understood that a computing system may be differently configured and include different components, including having fewer or more components as depicted in FIG. 20.

As illustrated in FIG. 20, the computing system 2000 includes one or more central processing units (CPU) 2001 that provides computing resources and controls the computer. CPU 2001 may be implemented with a microprocessor or the like and may also include one or more graphics processing units (GPU) 2002 and/or a floating-point coprocessor for mathematical computations. In one or more embodiments, one or more GPUs 2002 may be incorporated within the display controller 2009, such as part of a graphics card or cards. The system 2000 may also include a system memory 2019, which may comprise RAM, ROM, or both.

A number of controllers and peripheral devices may also be provided, as shown in FIG. 20. An input controller 2003 represents an interface to various input device(s) 2004, such as a keyboard, mouse, touchscreen, and/or stylus. The computing system 2000 may also include a storage controller 2007 for interfacing with one or more storage devices 2008 each of which includes a storage medium such as magnetic tape or disk, or an optical medium that might be used to record programs of instructions for operating systems, utilities, and applications, which may include embodiments of programs that implement various aspects of the present disclosure. Storage device(s) 2008 may also be used to store processed data or data to be processed in accordance with the disclosure. The system 2000 may also include a display controller 2009 for providing an interface to a display device 2011, which may be a cathode ray tube (CRT) display, a thin film transistor (TFT) display, organic light-emitting diode, electroluminescent panel, plasma panel, or any other type of display. The computing system 2000 may also include one or more peripheral controllers or interfaces 2005 for one or more peripherals 2006. Examples of peripherals may include one or more printers, scanners, input devices, output devices, sensors, and the like. A communications controller 2014 may interface with one or more communication devices 2015, which enables the system 2000 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 2000 comprises one or more fans or fan trays 2018 and a cooling subsystem controller or controllers 2017 that monitors thermal temperature(s) of the system 2000 (or components thereof) and operates the fans/fan trays 2018 to help regulate the temperature.

In the illustrated system, all major system components may connect to a bus 2016, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 21:
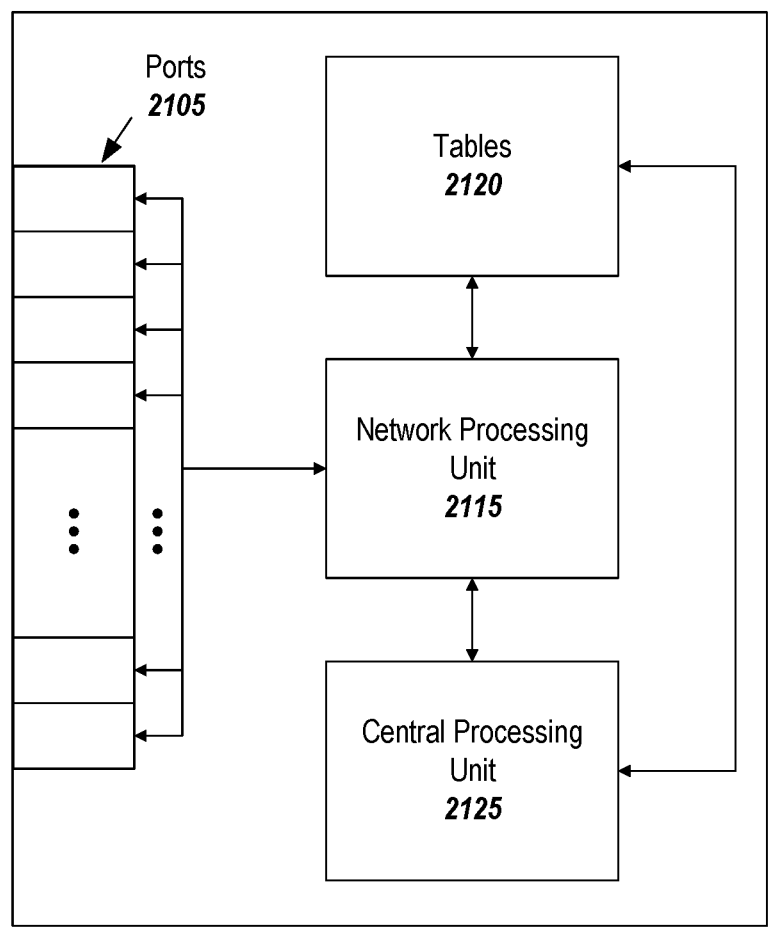
FIG. 21 depicts an alternative block diagram of an information handling system, according to embodiments of the present disclosure.

FIG. 21 depicts an alternative block diagram of an information handling system, according to embodiments of the present disclosure. It will be understood that the functionalities shown for system 2100 may operate to support various embodiments of the present disclosure—although it shall be understood that such system may be differently configured and include different components, additional components, or fewer components.

The information handling system 2100 may include a plurality of I/O ports 2105, a network processing unit (NPU) 2115, one or more tables 2120, and a central processing unit (CPU) 2125. The system includes a power supply (not shown) and may also include other components, which are not shown for sake of simplicity.

In one or more embodiments, the I/O ports 2105 may be connected via one or more cables to one or more other network devices or clients. The network processing unit 2115 may use information included in the network data received at the node 2100, as well as information stored in the tables 2120, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for use in an NVMe™-over-Fabric (NVMe-oF™) system comprising one or more elements of a non-volatile memory express (NVMe™) entity, the method comprising:
  receiving, at an information handling system of the NVMe-oF™ system comprising a centralized storage fabric service for the NVMe-oF™ system, communication comprising one or more messages from an NVMe™ entity;
  establishing a connection between the information handling system and the NVMe™ entity;
  extracting information about the NVMe™ entity from communication with the NVMe™ entity, the information comprising:
    an indication of a type of NVMe™ entity;
    transport address information and transport service information that specify a communication endpoint for an element of the NVMe™ entity;
    a NVMe™ Qualified Name (NQN); and
    a symbolic name (SYM) for referring to the NVMe™ entity, responsive to the symbolic name being included in the communication with NVMe™ entity; and
  using at least some of the extracted information to register the NVMe™ entity in a centralized registration datastore by creating a registration entry associated with the NVMe™ entity, which registration entry is discoverable by one or more other NVMe™ entities in the NVMe-oF™ system.

2. The computer-implemented method of claim 1 further comprising:
  responsive to a symbolic name not being included in the communication with NVMe™ entity, assigning a symbolic name (SYM) for referring to the NVMe™ entity.

3. The computer-implemented method of claim 1, further comprising
  receiving a discovery controller registration command (DCRC) from the NVMe™ entity, the DCRC comprising an identifier indicating a number of registrations the NVMe™ entity seeks to register with the centralized storage fabric service; and
  receiving from the NVMe™ entity an NVMe™ registration for each element corresponding to the number of registrations indicated in the discovery controller registration command (DCRC); and responsive to one of the NVMe™ registrations corresponding to an implicit registration entry in the centralized registration datastore, updating the implicit registration entry in the centralized registration datastore to include a symbolic name if one is not associated with the entry.

4. The computer-implemented method of claim 1 wherein the centralized registration datastore comprises a plurality of NVMe™ registrations corresponding to a plurality of NVMe™ entities and a symbolic name is used by two or more registered NVMe™ entities.

5. The computer-implemented method of claim 1 wherein the centralized registration datastore comprises a plurality of NVMe™ registrations corresponding to a plurality of NVMe™ entities comprising one or more NVMe™ hosts and one or more non-volatile memory (NVM) subsystems and the method further comprises:
receiving, at the centralized storage fabric service, a query to identify a listing of registered elements that are relevant to an NVMe™ entity that sent the query, in which the listing of registered elements is obtained from the centralized registration datastore of NVMe™ registrations; and
transmitting to the NVMe™ entity that sent the query, a listing of registered elements from the centralized registration datastore of registered elements that are relevant to the NVMe™ entity, wherein, for at least one of the registered elements in the listing of registered elements, the registered element is identified by its symbolic name.

6. The computer-implemented method of claim 1:
wherein the centralized registration datastore comprises a plurality of NVMe™ registrations corresponding to a plurality of NVMe™ entities comprising one or more NVMe™ hosts and one or more non-volatile memory (NVM) subsystems; and
wherein each NVMe™ registration was created for its corresponding NVMe™ entity:
(a) by the corresponding NVMe™ entity expressly requesting the centralized storage fabric service to register it in the centralized registration datastore; or
(b) by the centralized storage fabric service implicitly registering the corresponding NVMe™ entity; and
the method further comprises:
receiving, at the centralized storage fabric service, a request from a requesting NVMe™ entity for a list of one or more elements of one or more NVMe™ entities;
using the centralized registration datastore to generate the list of one or more elements of one or more NVMe™ entities for the request;
sending the generated list to the requesting NVMe™ entity, wherein, for at least one element of the one or more elements of one or more NVMe™ entities in the list, the at least one element is identified by its symbolic name;
receiving, from the requesting NVMe™ entity, a set of one or more elements from the generated list that are to be allowed access to at least one common storage element; and
responsive to receiving the set of one or more elements, forming an access control zone that grants access among the set of one or more elements.

7. The computer-implemented method of claim 1 further comprises:
responsive to a change in the centralized registration datastore, transmitting a notification of the change to one or more NVMe™ entities of the NVMe-oF™ system.

8. The computer-implemented method of claim 7 further comprises:
receiving, at the centralized storage fabric service, a request from a requesting NVMe™ entity for an updated list of one or more elements of one or more NVMe™ entities;
using information in the centralized registration datastore to generate the updated list of one or more elements of one or more NVMe™ entities for the request; and
sending the generated updated list to the requesting NVMe™ entity, wherein, for at least one element of the one or more elements of the one or more NVMe™ entities in the generated updated list, the at least one element is identified by its symbolic name.

9. A system for use in an NVMe™-over-Fabric (NVMe-oF™) environment comprising one or more elements of a non-volatile memory express (NVMe™) entity, the system comprising:
one or more processors; and
a non-transitory computer-readable medium or media comprising one or more sets of instructions which, when executed by at least one of the one or more processors, causes steps to be performed comprising:
receiving, at an information handling system of the NVMe-oF™ environment comprising a centralized storage fabric service for the NVMe-oF™ environment, communication comprising one or more messages from an NVMe™ entity;
establishing a connection between the information handling system and the NVMe™ entity;
extracting information about the NVMe™ entity from communication with the NVMe™ entity, the information comprising:
an indication of a type of NVMe™ entity;
transport address information and transport service information that specify a communication endpoint for an element of the NVMe™ entity;
a NVMe™ Qualified Name (NQN); and
a symbolic name (SYM) for referring to the NVMe™ entity, responsive to the symbolic name being included in the communication with NVMe™ entity; and
using at least some of the extracted information to register the NVMe™ entity in a centralized registration datastore by creating a registration entry associated with the NVMe™ entity, which registration entry is discoverable by one or more other NVMe™ entities in the NVMe-oF™ environment.

10. The system of claim 9, wherein the non-transitory computer-readable medium or media further comprises one or more sets of instructions which, when executed by at least one of the one or more processors, causes steps to be performed comprising:
responsive to a symbolic name not being included in the communication with NVMe™ entity, assigning a symbolic name (SYM) for referring to the NVMe™ entity.

11. The system of claim 9, wherein the non-transitory computer-readable medium or media further comprises one or more sets of instructions which, when executed by at least one of the one or more processors, causes steps to be performed comprising:

receiving a discovery controller registration command (DCRC) from the NVMe™ entity, the DCRC comprising an identifier indicating a number of registrations the NVMe™ entity seeks to register with the centralized storage fabric service; and receiving from the NVMe™ entity an NVMe™ registration for each element corresponding to the number of registrations indicated in the discovery controller registration command (DCRC); and responsive to one of the NVMe™ registrations corresponding to an implicit registration entry in the centralized registration datastore, updating the implicit registration entry in the centralized registration datastore to include a symbolic name if one is not associated with the entry.

12. The system of claim 9 wherein the centralized registration datastore comprises a plurality of NVMe™ registrations corresponding to a plurality of NVMe™ entities and a symbolic name is used by two or more registered NVMe™ entities.

13. The system of claim 9 wherein the centralized registration datastore comprises a plurality of NVMe™ registrations corresponding to a plurality of NVMe™ entities comprising one or more NVMe™ hosts and one or more NVM non-volatile memory (NVM) subsystems and the non-transitory computer-readable medium or media further comprises one or more sets of instructions which, when executed by at least one of the one or more processors, causes steps to be performed comprising:

receiving, at the centralized storage fabric service, a query to identify a listing of registered elements that are relevant to an NVMe™ entity that sent the query, in which the listing of registered elements is obtained from the centralized registration datastore of NVMe™ registrations; and transmitting to the NVMe™ entity that sent the query, a listing of registered elements from the centralized registration datastore of registered elements that are relevant to the NVMe™ entity, wherein, for at least one of the registered elements in the listing of registered elements, the registered element is identified by its symbolic name.

14. The system of claim 9:
wherein the centralized registration datastore comprises a plurality of NVMe™ registrations corresponding to a plurality of NVMe™ entities comprising one or more NVMe™ hosts and one or more non-volatile memory (NVM) subsystems; and
wherein each NVMe™ registration was created for its corresponding NVMe™ entity:
(a) by the corresponding NVMe™ entity expressly requesting the centralized storage fabric service to register it in the centralized registration datastore; or
(b) by the centralized storage fabric service implicitly registering the corresponding NVMe™ entity; and
the non-transitory computer-readable medium or media further comprises one or more sets of instructions which, when executed by at least one of the one or more processors, causes steps to be performed comprising:
receiving, at the centralized storage fabric service, a request from a requesting NVMe™ entity for a list of one or more elements of one or more NVMe™ entities;
using the centralized registration datastore to generate the list of one or more elements of one or more NVMe™ entities for the request;

sending the generated list to the requesting NVMe™ entity, wherein, for at least one element of the one or more elements of one or more NVMe™ entities in the list, the at least one element is identified by its symbolic name;

receiving, from the requesting NVMe™ entity, a set of one or more elements from the generated list that are to be allowed access to at least one common storage element; and responsive to receiving the set of one or more elements, forming an access control zone that grants access among the set of one or more elements.

15. The system of claim 9, wherein the non-transitory computer-readable medium or media further comprises one or more sets of instructions which, when executed by at least one of the one or more processors, causes steps to be performed comprising:

responsive to a change in the centralized registration datastore, transmitting a notification of the change to one or more NVMe™ entities of the NVMe-oF™ environment.

16. The system of claim 15, wherein the non-transitory computer-readable medium or media further comprises one or more sets of instructions which, when executed by at least one of the one or more processors, causes steps to be performed comprising:

receiving, at the centralized storage fabric service, a request from a requesting NVMe™ entity for an updated list of one or more elements of one or more NVMe™ entities;

using information in the centralized registration datastore to generate the updated list of one or more elements of one or more NVMe™ entities for the request; and sending the generated updated list to the requesting NVMe™ entity, wherein, for at least one element of the one or more elements of the one or more NVMe™ entities in the generated updated list, the at least one element is identified by its symbolic name.

17. A system for use in an NVMe™-over-Fabric (NVMe-oF™) environment comprising one or more elements of a non-volatile memory express (NVMe™) entity, the system comprising:

a centralized storage fabric service that:
receives communication comprising one or more messages from an NVMe™ entity;
facilitates establishing a connection between the centralized storage fabric service and the NVMe™ entity;
extracts information about the NVMe™ entity from communication with the NVMe™ entity, the information comprising:
an indication of a type of NVMe™ entity;
transport address information and transport service information that specify a communication endpoint for an element of the NVMe™ entity; and
a NVMe™ Qualified Name (NQN); and
a symbolic name (SYM) for referring to the NVMe™ entity, responsive to the symbolic name being included in the communication with NVMe™ entity; and
uses at least some of the extracted information to register the NVMe™ entity in a centralized registration datastore by creating a registration entry associated with the NVMe™ entity, which registration entry is discoverable by one or more other NVMe™ entities in the NVMe-oF™ environment; and the centralized registration datastore for storing one or more registration entries, which are discoverable by one or more other NVMe™ entities in the NVMe-oF™ environment.

18. The system of claim 17, wherein the centralized storage fabric service further causes steps to be performed comprising:
responsive to a symbolic name not being included in the communication with NVMe™ entity, assigning a symbolic name (SYM) for referring to the NVMe™ entity.

19. The system of claim 17 wherein the centralized registration datastore comprises a plurality of NVMe™ registrations corresponding to a plurality of NVMe™ entities and a symbolic name is used by two or more registered NVMe™ entities.

20. The system of claim 17:
wherein the centralized registration datastore comprises a plurality of NVMe™ registrations corresponding to a plurality of NVMe™ entities comprising one or more NVMe™ hosts and one or more non-volatile memory (NVM) subsystems; and
wherein each NVMe™ registration was created for its corresponding NVMe™ entity:
(a) by the corresponding NVMe™ entity expressly requesting the centralized storage fabric service to register it in the centralized registration datastore; or
(b) by the centralized storage fabric service implicitly registering the corresponding NVMe™ entity; and the centralized storage fabric service is further configured to cause steps to be performed comprising:
receiving, at the centralized storage fabric service, a request from a requesting NVMe™ entity for a list of one or more elements of one or more NVMe entities;
using the centralized registration datastore to generate the list of one or more elements of one or more NVMe™ entities for the request;
sending the generated list to the requesting NVMe™ entity, wherein, for at least one element of the one or more elements of one or more NVMe™ entities in the list, the at least one element is identified by its symbolic name;
receiving, from the requesting NVMe™ entity, a set of one or more elements from the generated list that are to be allowed access to at least one common storage element; and
responsive to receiving the set of one or more elements, forming an access control zone that grants access among the set of one or more elements.

* * * * *